United States Patent [19]

Dussy et al.

[11] 4,024,123
[45] May 17, 1977

[54] FIBER-REACTIVE, HEAVY METAL-CONTAINING FORMAZANE DYESTUFFS

[76] Inventors: Paul Dussy, 49, Gruthweg, Munchenstein; Hans Ackermann, 11, Bierastrasse, Bottmingen, both of Switzerland

[22] Filed: Mar. 7, 1974

[21] Appl. No.: 449,205

Related U.S. Application Data

[63] Continuation of Ser. No. 271,616, July 13, 1972, abandoned, which is a continuation of Ser. No. 89,502, Nov. 13, 1970, abandoned, which is a continuation of Ser. No. 795,035, Jan. 28, 1969, abandoned, which is a continuation-in-part of Ser. No. 653,611, July 17, 1967, abandoned.

[30] Foreign Application Priority Data

| July 21, 1966 | Switzerland | 10582/66 |
|---|---|---|
| Jan. 29, 1968 | Switzerland | 1330/68 |
| Jan. 29, 1968 | Switzerland | 1327/68 |

[52] U.S. Cl. .................... 260/146 D; 260/146 R; 260/146 T; 260/147; 260/148; 260/149; 260/152; 260/153; 260/154; 260/176; 260/192; 260/193; 260/208

[51] Int. Cl.² ................ C09B 62/08; C09B 62/16; C09B 62/24; C09B 62/50

[58] Field of Search ....... 260/146 R, 146 D, 146 T, 260/148, 147, 149

[56] References Cited

UNITED STATES PATENTS

| 3,202,649 | 8/1965 | Steinemann | 260/146 T |
|---|---|---|---|
| 3,202,650 | 8/1965 | Steinemann | 260/146 T |
| 3,244,690 | 4/1966 | Steinemann | 260/146 T |
| 3,547,901 | 12/1970 | Lienhard | 260/146 T |
| 3,565,881 | 2/1971 | Dussy et al. | 260/147 |
| 3,725,382 | 4/1973 | Grandjean | 260/146 D |

*Primary Examiner*—Floyd D. Higel
*Attorney, Agent, or Firm*—Wenderoth, Lind & Ponack

[57] ABSTRACT

Fiber-reactive, heavy metal-containing formazane dyestuffs are disclosed which are tricyclic and wherein the heavy metal is a metal of an atomic number ranging from 24 to 30 and is bonded via a —COO— and —O— substituent to different diazo components and to the terminal nitrogen atoms of the central formazane bridge portion

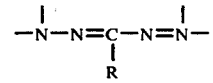

wherein R represents an optionally substituted aliphatic hydrocarbon radical, a cycloaliphatic radical or a carbo- or heterocyclic-aromatic radical, one of the aforesaid diazo components or the radical R bearing the fiber-reactive substituent. These dyestuffs are useful for the dyeing and printing of textile materials, and also of synthetic materials for other then textile uses. The dyestuffs may contain or may be free from water-solubilizing groups the former being especially useful for the dyeing of leather, paper, and natural or synthetic polypeptide fiber materials, as well as for the dyeing and printing of material or regenerated cellulosic fiber materials, especially cotton. Dyestuffs in which this fiber-reactive substituent is a pyrimidyl amino radical containing at least one fluorine atom are distinguished by their high reactivity; dyeings or prints obtained therewith are very stable vis-a-vis acid or alkaline hydrolysis and exhibit very good fastness to light, milling and wet treatments.

19 Claims, No Drawings

FIBER-REACTIVE, HEAVY METAL-CONTAINING FORMAZANE DYESTUFFS

This application is a continuation of application Ser. No. 271,616, filed July 13, 1972 (now abandoned), which application is a continuation of application Ser. No. 89,502, filed Nov. 13, 1970 (now abandoned), which application is a continuation of application Ser. No. 795,035, filed Jan. 28, 1969 (now abandoned), the latter application being a continuation-in-part of application Ser. No. 653,611, filed July. 17, 1967 (now abandoned).

DESCRIPTION OF THE INVENTION

The present invention concerns new, valuable, fiber-reactive, heavy metal-containing formazane dyestuffs having very pure shades, processes for the production of these dyestuffs, their use for the dyeing or printing of organic materials, particularly textile material as well as, as industrial product, the material dyed or printed using the new dyestuffs.

Because of their purity of shade, blue to green anthraquinone dyestuffs are of particular interest. Up to the present, it has not been possible to produce azo dyestuffs with equally pure blue to green shades and equally good total fastness properties.

It has now been found that new, reactive, heavy metal-containing formazane dyestuffs of the general formula I

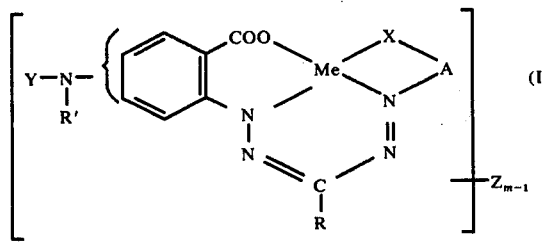

have shades which, in addition to their great colour strength, good fastness properties and good fastness to light, in their purity attain the usual standard for anthraquinone dyestuffs. In addition, they can be produced by the use of cheap starting materials.

In this formula

A represents the radical of a diazo component which contains X in the o-position to the azo bond, X represents a metal binding substituent, P represents an optionally substituted aliphatic hydrocarbon radical a cycloaliphatic radical or a carbo- or heterocyclic-aromatic radical, R' represents hydrogen or a lower alkyl group, Y represents a acyl radical which enters into at least one covalent bond with the substrate, Z represents a salt-forming, water solubilising group which dissociates acid in water, Me represents a heavy metal of the atomic numbers 24 to 30, and m represents a positive whole number of at most 7.

As radical of a diazo component, A preferably belongs to the series of aromatic carbocycles which can be mono- or di-nuclear. Chiefly A is the radical of an o-phenylene compound, optionally also the radical of an o-naphthylene compound which can contain further ring substituents usual in azo dyestuffs or can be condensed with other heterocycles. In the latter case A is, e.g. the radial of a 1,3-benzo-oxythiol-3,3-dioxide.

Examples of substituents in the ring A which are usual in azo dyestuffs are: halogen such as fluorine, chlorine or bromine, lower alkyl groups such as methyl, ethyl, isopropyl or tert.butyl groups; ether groups, preferably aryloxy groups such as the phenoxy group; lower alkylsulphonyl groups such as the methyl- or ethyl-sulphonyl group; lower alkanoyl groups such as the acetyl or propionyl group; sulphonic acid amide groups including the N-mono- and N,N-di-lower-alkyl substituted amide groups such as the sulphamoyl, sulphonic acid-N-methyl, sulphonic acid-N,N-dimethyl sulphonic acid-N-ethyl, sulphonic acid-N,N-diethyl or sulphonic acid-N-propylamido group; nitro or cyano group; or β-sulphatoethyl or β-halogenethyl sulphonic acid group or β-sulphatoethyl or β-halogenethyl sulphonic acid amide group.

As substituent important for the metal complex formation, the radical A contains a metal binding substituent symbolised by X in o-position to the azo bond. This substituent is derived, e.g. from a hydroxyl group or a carboxyl group or from an acidic imide group, the latter being substituted, e.g. by the radical of an organic sulphonic acid. In particularly valuable dyestuffs according to the invention, A represents an o-phenylene radical substituted by a sulphonic acid group, which phenylene radical can optionally be further substituted by a sulphonic acid group, a lower alkylsulphonyl group, sulphonic acid amide group, mono- or N,N-di-lower alkylsulphonic acid amide group, and X is oxygen.

When R represents an unsubstituted aliphatic hydrocarbon radical, then it is, e.g. straight or branched chain alkyl or alkenyl groups (in the latter case particularly $\Delta^2$-alkenyl groups) having, preferably, up to 8 carbon atoms such as the methyl, ethyl, n-propyl, isopropyl, allyl, n-butyl, sec.butyl, tert.butyl, n-amyl, tert.amyl, n-hexyl, n-heptyl and n-octyl group. All these groups can contain, as substituents, halogen atoms such as fluorine or chlorine, the cyano group, a lower alkoxy group such as the methoxy or ethoxy group, an aralkoxy group such as the benzyloxy group, an aryloxy group such as the phenoxy group, a carbalkoxy group such as the acetyloxy, propionyloxy or benzoyloxy group, a carbacyl group such as the acetyl, propionyl or benzoyl group, an alkoxycarbonyl group such as the methoxycarbonyl or ethoxycarbonyl group, or an N,N-dialkylamino group such as the N,N-dimethylamino or N,N-diethylamino group. The aliphatic hydrocarbon radical R, however, can also be substituted by aromatic radicals, in which case particularly by the phenyl radical. In this case, e.g. the benzyl or phenethyl group is meant.

As cycloalphatic radical symbolised by R, e.g. cycloalkyl groups having, preferably, 5- or 6-membered rings, in particular the cyclohexyl group, are meant.

When R is a carbocyclic-aromatic radical, preferably radicals of mono- or di-nuclear aromates, particularly the phenyl group or also the naphthyl group is meant. The phenyl group can contain, as further ring substituents, e.g. halogen such as chlorine, also fluorine or bromine; the hydroxyl, nitro or cyano group; alkyl and alkoxy groups having up to 5 carbon atoms, di-lower-alkylamino groups, sulphonic acid-N,N-di-lower-alkylamide groups or lower alkylsulphonyl groups.

When R is a heterocyclic-aromatic radical, it is chiefly the pyrazolyl-2, furyl-2, thienyl-2, pyridyl-3, pyridyl-4-quinolyl-4 and benzimidazolyl-2 radical.

When R' is a lower alkyl group, this preferably has from 1 to 5 carbon atoms; e.g. it is the methyl, ethyl, isopropyl or tert.butyl group.

In preferred formazane dyestuffs of formula I, R is a, at most, dinuclear carbocyclic-aromatic radical, particularly a phenyl radical optionally substituted by 1 or 2 sulphonic acid groups and/or by halogen, particularly chlorine, or lower alkyl groups, particularly methyl, and R' is hydrogen.

The acyl radical Y which enters into at least one covalent bond with the substrate is derived from organic carboxylic acids, organic sulphonic acids as well as from nitrogen heterocycles which contain the so-called fibre reactive groupings which can be split off under the dyeing conditions together with the pair of electrons forming the bond or which contain at least one polylinkage to which addition can be made. If Y is the radical of an organic carboxylic acid, then it is, e.g. a preferably lower aliphatic carboxylic acid radical having a polylinkage to which addition can be made such as an unsubstituted alkenoyl radical, e.g. the acryloyl or methacryloyl, fumaroyl or maleinoyl radical, an alkinoyl radical such as the propioloyl radical or a substituted alkanoyl or alkenoyl radicals such as the chloro- or bromo-acetyl, β-chloropropionyl, α- or β-chloro- or β- or 3-bromo-acryloyl, α,β-dibromopropionoyl, monochloro- or monobromomaleinoyl or β-chlorocrotonoyl radical.

Fibre reactive, particularly cellulose reactive, dyestuffs obtainable according to the invention contain, as reactive acyl radical Y, preferably the radical of a nitrogen heterocycle, especially the radical of aromatic 6-membered nitrogen heterocycles or of a halogen polyazine carboxylic acid containing advantageously more than one ring hetero atom. These heterocyles contain at least one mobile halogen atom, preferably chlorine or also fluorine or bromine, or instead of these halogen atoms an ammonium or sulphonic acid or alkylsulphonyl group as substituent at the ring carbon atom and, optionally, they are bound to the

group of dyestuffs of formula I according to the invention by way of a carbonyl or sulphonyl group.

If such acyl radicals Y contain several fibre reactive groupings, then reaction products of such a group with organic radicals, particularly with a primary or secondary amine, or a water soluble dyestuff containing an acylatable amino group, or with an organic compound, from which latter dyestuffs can be formed, can also be used.

As examples of such preferred fibre reactive acyl groups Y containing a component which can be split off under the dyeing conditions together with the pair of electrons forming the bond can be mentioned: cyanuric chloride derivatives such as 2,4-dichloro-, 2,4-dibromo-, 2-chloro- or 2-bromo-4-amino-, 2-chloro- or 2-bromo-4-low-alkoxy-, -4-phenylamino-, -4-(2'- or 4'-sulphophenylamino)-, -4-(2', 4'- or 2', 5'-disulphophenylamino)-, 2-chloro-4-[4'', 8''-disulphonaphthyl-2''-azo-(4')]-phenylamino-, 2-chloro-4-[4'', 7''-disulphonaphthyl-2''-azo-(4')]-3'-methyl-, the 2-chloro-4-[3'-(4''-(4'''-sulphophenylazo)-3''-carboxyl-5''-pyrazolon-1''-yl)]-phenylamino- or 2-chloro-4-[3'-(4''-(2''', 4'''-disulphophenylazo)-3''-carboxyl-5''-pyrazolon-1''-yl) ]-phenylamino-1,3,5-triazinyl-6-radical or also the 1,3,5-triazine-2-dimethylamino-4-fluoro-6-N-methyl-N-carbonyl radical;

derivatives of the pyrimidyl-6 radical such as the 2,4-dichloro-, 2,4-dibromo-, 2-chloro-4-(2'-sulphophenylamino)-, 2-chloro-4-carboxylic acid arylamide-, 2-chloro-5-cyano- or -5-acetyl-, 2,4,5-trichloro-, 2,4,5-tribromo-, 2,4-dichloro-5-cyano-, -5-acetyl-, -5-alkyl-, -5-aryl-, -5-carboxylic acid arylamide-, -5-arylsulphonyl- or -5-bromo-pyrimidyl-6 radical, as well as derivatives of the pyrimidyl-5 radical such as 2-chloro- or 2-bromo-pyrimidyl-5-carbonyl radical having further halogen in the 4-position, or a 2-chloro- or 2-bromo-pyrimidyl-6-carbonyl radical having further halogen in 4- or 4,5-position, or having an inert substituent, e.g. a lower alkyl, halogenoalkyl or dihalogenoalkyl or a phenyl group in one position and halogen in the other, e.g. the 2,4-dichloro-6-methyl-pyrimidyl-5-carbonyl radical, or having two inert substituents in these positions.

Also reaction products of these fibre reactive groups containing mobile halogen can be used. These then contain, e.g. at least one ammonium substituent which can be split off, e.g. an N-pyridinium, N-trialkylammonium, an N-triethylene-diammonium or an asymmetrical N-dialkyl hydrazinium group.

Derivatives of quinoxaline such as a 2,3-dichloro-quinoxaline -6-carbonyl or -6-sulphonyl radical, derivatives of phthalazine such as a 1,4-dichloro- or 1,4-dibromo-phthalazine-6-carbonyl radical, derivatives of quinazoline such as a 2,4-dichloro-quinazoline-6- or -7-carbonyl radical, derivatives of pyridazone such as a 4,5-dichloro-pyridazone-(6)-1-alkanoyl- or -1-phenylcarbonyl radical, derivatives of benzothiazole and benzoxazole such as 2-chloro- or 2-sulpho-benzothiazole-6-carbonyl or -6-sulphonyl radical or 2-chloro- or 2-sulpho-benzoxazole-6-carbonyl or -6-sulphonyl radical, derivatives of benzoylsulphonyl or phenylsulphonyl radicals such as the m-nitro, m-methylsulphonyl or m-sulphamyl-phenylcarbonyl or sulphonyl radical having mobile halogen, preferably fluorine or also chlorine in o- or p-position to the nitro, methylsulphonyl or sulphamyl group.

Preferably the

group is in the p-position to the hydrazone group.

Preferred fibre reactive acyl groups Y are derived from cyanuric chloride or its mono-reaction products or from tetrachloro -pyrimidine, 2,4-dichloropyrimidine-5- or -6-carboxylic acid or its mono-reaction products.

Dyestuffs according to the invention preferably contain sulphonic acid groups, but also phosphonic acid groups or carboxyl or disulphimide or monoester groups of polybasic acids, e.g. sulphate groups as salt forming, water solubilising groups corresponding to Z which dissociate acid in water. In the dyestuff molecule, Z can also have more than one of these meanings.

The fiber-reactive, heavy metal-containing formazane dyestuffs of formula I can be produced by methods known per se.

They are produced, e.g. by coupling the diazonium compound of an amine of the general formula II

wherein A has the meaning given in formula I, and

X' represents a metallisable group or a substituent which can be converted into a metallisable group, with a coupling component of the general formula III

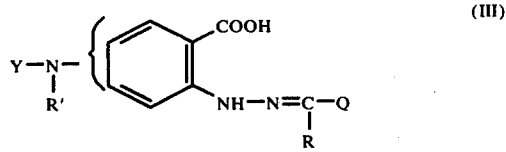

wherein Y, R' and R have the meanings given in formula I, and

Q represents hydrogen or a substituent which can be replaced by azo coupling, to form a formazane dyestuff of the general formula IV

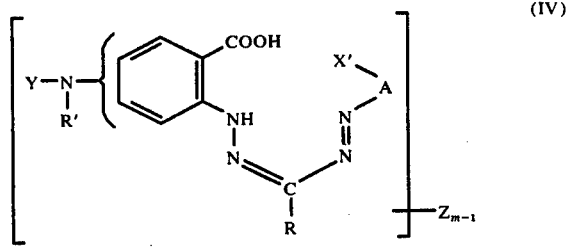

wherein A, R, R', Y, Z and $m$ have the meanings given in formula I and

X' has the meaning given in formula II, the components of formulae II and III being so chosen that the formazane dyestuff of formula IV contains at most 6 Z, and reacting the formazane dyestuff obtained of formula IV, simultaneously or subsequently, with an agent introducing a heavy metal Me, to form a formazane dyestuff of formula I.

Naturally the groups given in the description of X in formula I can be used as metallisable groups X'. Examples of substituents X' which can be converted into metallisable groups are lower, optionally substituted, alkoxy groups such as the methoxy, ethoxy, carboxymethoxy or carboxyethoxy group, also bis-alkyl- or bis-aryl-sulphonylamide groups or acyloxy groups which, after diazotisation and coupling, can easily be saponified to alkyl- or aryl-sulphonylamide or hydroxyl groups. Finally, X' can represent a substituent which, under oxidising coppering conditions, can be converted into oxygen having two separate bonds, e.g. hydrogen or the sulphonic acid group.

If Q in coupling components of the general formula III represents a substituent which can be replaced by azo coupling then it is the formyl or carboxyl group or a substituent which can be converted into the carboxyl group, such as a cyano, carboxylic acid ester or carboxylic acid amide group.

Advantageously the o-hydroxyaminobenzene and o-hydroxyaminonaphthalene as well as o-caboxyamino-benzene and -naphthalene compounds usual in the production of metallisable azo dyestuffs are used as diazo components of formula II having a metallisable group X' in the o-position to the nitrogen bond. As examples can be mentioned: 2-hydroxyl-1-aminobenzenes mono- and poly-substituted by identical or different lower alkyl, halogen, nitro, cyano, alkanoyl, alkylsulphonyl, sulphamide, N-alkyl- or N-cycloalkyl-sulphamide or β-chloroethylsulphonyl, β-hydroxyethylsulphonyl sulphuric acid esters, β-hydroxyethylsulphamoyl sulphuric acid esters, 2-hydroxy-1-aminobenzene-3-, -4-, -5-, or -6-, sulphonic acids or 2-aminobenzene-1-carboxylic acids or sulphonated 2-aminobenzene-1-carboxylic acids such as 2-aminobenzene-1-carboxylic acid -5-sulphonic acid, also optionally further substituted, particularly sulphonated, o-aminonaphthalene carboxylic acids such as 2-aminonaphthalene-3-carboxylic acid, 2-amino-3-carboxy-naphthalene-6-sulphonic acid and -6,8-disulphonic acid, 1-hydroxy-2-aminonaphthalene sulphonic acids and 2-hydroxy-1- or -3-aminonaphthalene sulphonic acids, such as 2-hydroxy-1-amino-naphthalene-4-sulphonic acid and its compound nitrated or sulphonated in the 6-position.

As diazo components of formula II having a substituent X' in the o-position to the nitrogen bond which can be converted into a metallisable group can be mentioned, e.g.: 1-aminobenzene-2-bis-(alkyl- or aryl-sulphonyl)-imides as well as derivatives thereof substituted in the ring, e.g. 1-aminobenzene-2-bis-(4'-methylbenzene-sulphonyl)-imide as well as the corresponding 4- or 5-chloro, 4- or 5-alkylsulphonyl, 4- or 5-cyano, or 4- or 5-methyl compounds which can be diazotised, coupled and, under mild conditions, can be saponified in an alkaline medium to form the corresponding metallisable o-toluene sulphonylamidobenzene azo dyestuffs. Also o-low alkoxyarylamines can be used which are metallised under de-alkylating conditions.

Coupling components of general formula III can be produced by various methods. They are obtained, e.g. by condensing an aldehyde of formula V

with a hydrazine of formula VI

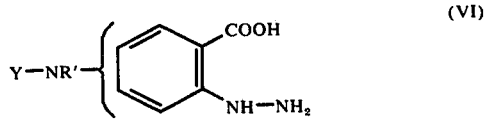

to form the aryl hydrazone of formula III, or by coupling an H-R-methine or H-R-methylene compound which can be coupled twice with a diazonium compound of an amine of formula VII

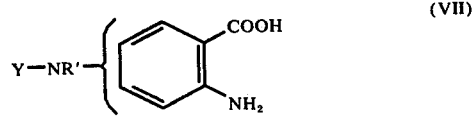

and then, if necessary, saponifying a substituted carboxylic acid or nitrile group Q to the carboxyl group.

In formula V, VI and VII, R, R' and Y have the meanings given in formula I.

As aldehydes of formula V for the production of the aryl hydrazones of formula III, chiefly carbocyclic-aromatic aldehydes are used as they lead to the particularly valuable dyestuffs. Examples of such aldehydes are: benzaldehyde, 2-, 3-, or 4-methyl-benzaldehyde, 4-methoxy-benzaldehyde, 3-nitrobenzaldehyde, 2-hydroxybenzaldehyde, 2- or 4-chlorobenzaldehyde, 2,4-dichlorobenzaldehyde, 2-chloro-5-sulphobenzaldehyde, 4-dimethylamino- or 4-diethylamino-benzaldehyde, 2-, 3- or 4-sulphobenzaldehyde and 2,4-disulphobenzaldehyde. Also, polynuclear and heterocyclic-aromatic aldehydes can be used, e.g. 1- or 2-naphthaldehyde, pyrazolyl-2-, furfurol-2-, thiophene-2-aldehyde, pyridine-3-aldehyde, quinoline-4-aldehyde and benzimidazole-2-aldehyde. Also aliphatic aldehydes can be used, e.g. propanal, crotonaldehyde, butyraldehyde, enanthaldehyde, phenylacetaldehyde or cinnamaldehyde.

Hydrazines of formula VI can be produced by the usual methods, e.g. by diazotising the corresponding acylaminobenzene carboxylic acids of formula VII and reducing their diazonium compound with salts of sulphurous acid while saponifying the N-sulphonic acids formed as intermediate products with strong mineral acid or with alkali stannites, to form the aryl hydrazine of formula VI.

The condensation of the aldehydes of formula V with the hydrazines of formula VI to the aryl hydrazones of formula III is performed very easily,, optionally by heating in aqueous or organic solution.

As methylene or methine compounds which can be coupled twice and which, on completion of the coupling, contain a carboxyl group or a substituent which can be converted into such at the methine carbon atom, are used, preferably, e.g. phenyl formyl acetic acid alkyl esters as well as the corresponding nitrile, also chlorophenyl formyl acetic acid alkyl ester, benzyl formyl acetic acid alkyl esters, phenylcyanoacetic acid, phenylcyanoacetic acid alkyl esters, phenylcyanoacetic acid amide, α-phenylacetacetic acid alkyl esters, α-phenylacetacetic acid nitrile or also α-naphthyl formyl acetic acid alkyl esters.

As diazo components of an amine of formula VII the following can be mentioned as easily accessible: 4- or 5-(2′, 4′-dichloro-s-triazinyl-6′-amino)-, 4- or 5-[2′-chloro-4′(3″-sulphophenylamino)-s-triazinyl-6′-amino]-, 4- or 5-(2′, 5′, 6′-trichloropyrimidyl -(4′) -amino)-, 4- or 5-(2′, 3′-dichloroquinoxaline-6′-carbonylamino)-, 4- or 5-(1′, 4′-dichlorophthalazine-6′-carbonylamino)-, 4- or 5-(2′, 4′-dichloro-quinazoline-6′-or -7′-carbonylamino)-, 4- or 5-[(4′, 5′-dichloropyrazine-6′on-1′-yl)-β-propionylamino]-2-aminobenzene-1-carboxylic acid.

The diazotisation of amines of formula VII and coupling with methylene or methine compounds which can be coupled twice to form the aryl hydrazone of formula III is performed by the usual methods, advantageously in a weakly alkaline medium and at a temperature of 0° to about 40° C.

The coupling of the diazonium compound of amines of formula II with the coupling components of formula III to form the formazane dyestuffs of formula IV is performed by known methods, advantageously in the presence of an agent introducing metal. e.g. agents introducing calcium, magnesium, zinc or coper. It is performed preferably in a weakly acid to weakly alkaline medium and at a temperature of 0° to about 40° C. If alkaline earth metals are used then these can very easily be replaced by a heavy metal Me from the formazane complex formed, e.g. by simple heating in an aqueous or organic solution containing the heavy metal salt.

As agents introducing heavy metal Me, with which the metal-free formazane compounds of formula IV are converted by known methods into their heavy metal complexes of formula I, the usual, advantageously water soluble, simple or complex salts of heavy metals of the atomic numbers 24 to 30 of organic or inorganic acids are used, i.e. the water soluble chromium, cobalt, nickel, zinc, manganese and, mainly, the copper or nickel salts of mineral acids or low fatty acids such as copper sulphate, copper acetate or nickel acetate. When heavy metal salts of mineral acids are used, metallisation is advantageously performed in the presence of a mineral acid buffering agent, of which examples are, in particular, alkali hyroxides or alkali carbonates or alkali metal salts of low fatty acids such as alkali acetates, or alkali metal salts of polybasic oxygen acids of phosphorus, or ammonia or tert.nitrogen bases such as pyridine. Optionally, also complex salts of these metals can be used.

At least equimolecular amounts of the agent introducing heavy metal are used so that at least one heavy metal atom is present per mol of dyestuff. Metallisation is usually completed even at room temperature; often however, heating up to about 80° C is necessary. Without complex forming agents, the metallisation is advantageously performed at pH values of 4 to 8 whilst in the presence of complex forming agents such as tartaric or citric acid, it is preferably performed at a pH of between about 8 and 14.

A modification of the process according to the invention for the production of new, heavy metal-containing, fiber-reactive formazane dyestuffs of formula I consists in reacting a heavy metal-containing aminoformazane dyestuff of formula VIII

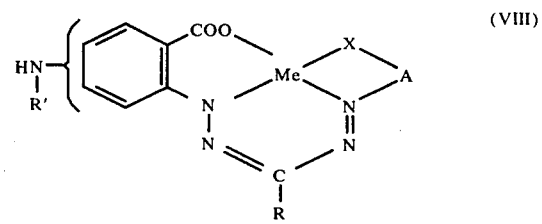

(VIII)

wherein A, R, R′, X and Me have the meanings given in formula I, with an agent introducing the fibre reactive acyl radical Y to form a formazane dyestuff of formula I, the components of formula VIII and the acylating agent introducing the fibre reactive radical being so chosen that A, R and Y in formula I contain together at most 6 Z as substituents.

Starting materials of formula VIII wherein

is an acylatable amino group can be obtained, e.g. by saponification of dyestuffs of formula I in which Y is an acyl group, e.g. an acetyl- or alkoxy-carbonyl group which can be obtained according to the invention, or they can also be produced by reduction of corresponding formazane dyestuffs of formula I which contain a nitro group instead of the characteristic

group. These nitroformazane dyestuffs can be produced by the usual diazotisation, coupling and metallisation methods.

As suitable agents introducing the fibre reactive radical Y in this embodiment of the invention, naturally the halides or anhydrides of the carboxylic acids and sulphonic acids metioned in the discussion of Y as well as isocyanates and isothiocyanates or halogen triazines and diazines containing more than one mobile halogen atom are used.

The reaction of the aminoformazane dyestuffs of formula VIII with the compound introducimg the fibre reactive acyl radical Y is performed in the usual way, advantageously in aqueous medium, optionally in the presence of inert organic solvents which can easily be removed such as low aliphatic ketones, e.g. acetone, and preferably in the presence of mineral acid buffering agents such as sodium or potassium carbonate, sodium or potassium hydroxide, di- or tri-sodium phosphate or di- or tri-potassium phosphate, sodium or potassium acetate or tertiary nitrogen bases such as pyridine.

Particularly valuable, easily accessible, heavy metal-containing, fiber-reactive formazane dyestuffs according to the invention which are distinguished by good dyeing properties are derived from formazane dyestuffs of formula I containing at least 2 and at most 6, preferably 2 to 4, sulphonic acid groups, in which Me is cooper or nickel, A and R are radicals of the benzene series, R' is hydrogen, X is oxygen and Y is a fibre reactive acyl radical, particularly the radical of an aromatic, 6-membered nitrogen heterocycle.

These particularly interesting fiber-reactive dyestuffs are obtained, e.g. by using the starting components having fibre reactive substituents mentioned above, or advantageously, by a modification of the process according to the invention, by subsequent reaction of dyestuffs containing acylatable amino groups of the general formula VIII with acylating agents introducing fibre reactive radicals Y, particularly with poly-N-heterocycles containing more than one mobile chlorine atom such as cyanuric chloride or its mono-reaction products, or tetrachloropyrimidine, with carboxylic acid chlorides having halogen polyazine rings such as 2,4-dichloropyrimidine-5- or -6-carboxylic acid chloride as well as their mono-reaction product.

The fiber-reactive, heavy metal-containing formazane dyestuffs of formula I obtainable according to the invention are worked up and isolated by the usual methods. Optionally, the crude products are purified by dissolving and recrystallising.

The fiber-reactive, heavy metal-containing formazane dyestuffs of formula I obtainable according to the invention are used for the dyeing and printing of textile and synthetic materials of all types. Heavy metal-containing formazane dyestuffs according to the invention containing no water solubilising groups can be used, e.g. for the dyeing of synthetic materials of all types such as lakes, varnishes or spinning masses made of acetyl cellulose or synthetic polyamides.

The fiber-reactive, heavy metal-containing formazane dyestuffs according to the invention which contain water solubilising groups such as carboxylic acid or phosphonic acid and, mainly, sulphonic acid groups, are dark powders which, in the form of their alkali metal salts, have very good water solubility. They are suitable for the dyeing and printing of leather, paper and fibre material, particularly natural or synthetic polypeptide fibre material such as wool, silk, synthetic polyamide and polyurethane fibres. Dyestuffs according to the invention which contain a sulphonic acid group, preferably a lower alkylsulphonyl or a sulphamoyl group, have very good affinity to wool and material which is dyed similarly thereto and, in many cases, are drawn onto such materials completely even from a neutral to weakly acid bath. Optionally, the water solubility of such dyestuffs is increased by the admixture of anion active or nonionogenic wetting and dispersing agents or of reducing agents.

For the dyeing of protein fibre material, the new fiber-reactive dyestuffs are preferably used in a weakly acid, e.g. weakly acetic acid bath. Often, the addition of compounds containing basic nitrogen, e.g. polyquarternary ammonium compounds, is indicated. Advantageously the dyeing is subjected to an aftertreatment with mineral acid binding agents such as ammonia or hexamethylenetetramine.

The new fiber-reactive formazane dyestuffs of formula I obtainable according to the invention are suitable, in particular, for the dyeing and printing of natural and regenerated cellulose material such as staple fibre, jute, ramie, hemp and, chiefly, cotton. To attain sufficient solubility, in this case the dyestuffs should generally contain at least 2, preferably 3 to 4, water solubilising, salt-forming groups which dissociate acid in water such as sulphonic acid or carboxyl groups.

These materials are dyed with the reactive formazane dyestuffs obtainable according to the invention by the known methods. Cellulose material is impregnated or printed at a low temperature, e.g. at 20° to 50° C with the optionally thickened dyestuff solution and then the dyestuff is fixed by treatment with acid binding agents. As such, e.g. sodium carbonate, potassium carbonate, di- and tri-sodium phosphate, sodium hydroxide solution and, at temperatures over 50° C, also potassium or sodium bicarbonate are used. Instead of subjecting the impregnated material to an alkaline after-treatment, in many cases the acid binding agent, preferably in the form of alkali carbonates, can also be added to the impregnation liquors or printing pastes and then the dyeing can be developed by short heating or steaming at temperatures of over 100° C to 160° or by storing for a longer time at room temperature. The addition of hydrotropic agents to the printing pastes and impregnating liquors is advantageous in this process, e.g. the addition of urea in amounts of 10 to 200g per liter dyeing agent.

In addition, cellulose material can be dyed with dyestuffs according to the invention by the exhaustion process by introducing the cellulose to be dyed into the dyebath having a long liquor ratio and slightly raised temperature and which contains an acid binding agent and, optionally, also neutral salts such as sodium chloride or sodium sulphate, gradually heating the dyebath to a temperature of 40° to 100° C and completing the dyeing process at this temperature. If desired, the neutral salts which accelerate the drawing of the dyestuff, can be added to the bath only after it has attained the actual dyeing temperature.

The new fiber-reactive dyestuffs are bound to the fibre by the treatment with acid binding agents, and cellulose dyeings in particular have excellent wet fastness after soaping to remove unfixed dyestuff.

The dyestuffs according to the invention are distinguished by their great colour strength and, chiefly by their pure shades. The strongly coloured dyeings obtained with the dyestuffs according to the invention are pure blue to pure green. They are distinguished particularly by their very good fastness to light and rubbing and by excellent wet fastness properties such as good fastness to washing, alkali, milling and perspiration. In addition the dyeings are level and have unexpectedly great stability to boiling. Also, the amount of reactive dyestuffs according to the invention which is fixed on the fibre is great; unfixed dyestuff is easily washed out which is one of the essential conditions for good wet fastness properties; and the dyeings are stable to the usual synthetic resin finishes.

An aliphatic substituent or aliphatic moiety of a substituent defined as "lower" in this specification or the appended claims means that such substituent or moiety has at most 5 carbon atoms unless expressly stated otherwise.

Preferred fiber-reactive dyestuffs falling under formula I, because of their accessibility and good all-round dyeing properties are those of the formula

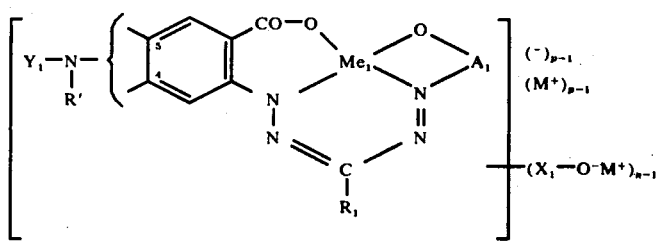

wherein
$Me_1$ represents Cu, Ni, Co or Cr $A_1$ represents a benzene nucleus or naphthalene nucleus substituted as shown above and further substituted by hydrogen, halogen of an atomic number of at most 35, nitro, cyano, lower alkyl, phenoxy, lower alkylsulphonyl, phenylsulphonyl, sulphamoyl, N-mono-lower alkyl-sulphamoyl, N,N-di-lower alkyl-sulphamoyl or lower alkanoyl, $R_1$ represents alkyl of from 1 to 7 carbon atoms, alkenyl of from 3 to 6 carbon atoms, phenyl-lower alkyl, phenyl-lower alkenyl, cycloalkyl of from 5 to 6 carbon atoms, cyano-lower alkyl, lower alkoxy-lower alkyl, phenoxy-lower alkyl, phenyl, halogeno-phenyl, halogen of an atomic number of at most 35, lower alkylphenyl, lower alkoxyphenyl, nitrophenyl, hydroxyphenyl, N,N-di-lower alkyl-aminophenyl, naphthyl, furfuryl, thiophenyl, pyridyl, quinolinyl or benzimidazolyl, R' represents hydrogen or lower alkyl, $X_1$ represents $-SO_2-$ or $-CO-$, $M^+$ represents the equivalent of a colorless cation, preferably an alkali metal ion or ammonium ion, n represents a number ranging from 1 to 7, p represents 2 when $Me_1$ is Cu, Co or Ni, and 1 when $Me_1$ is Cr; and $Y_1$ represents one of the following fiber-reactive groupings:

a. a radical of the formula

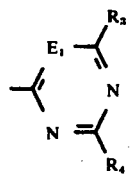

wherein
$E_1$ represents

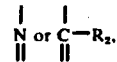

and, when $E_1$ is

either
i. $R_3$ represents halogen, tri-lower alkyl-ammonio, a group of the formula (IX)

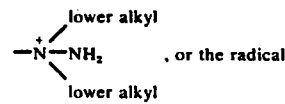

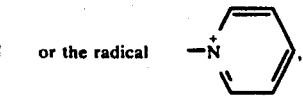

and $R_4$ represents lower alkoxy, phenoxy, amino, mono-lower alkyl-amino, di-lower alkyl-amino, phenylamino, sulfophenylamino or disulfophenylamino;

or ii. both $R_3$ and $R_4$ represent halogen; and, when $E_1$ is

$R_2$ represents hydrogen, halogen, lower alkyl, lower alkanoyl, cyano, nitro, phenyl, N-phenyl-carbamoyl or phenylsulfonyl, and each of $R_3$ and $R_4$ represents halogen;

b. a radical of one of the formulas

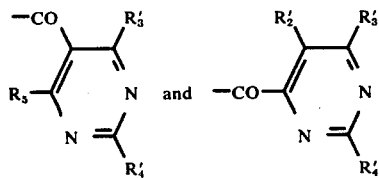

wherein
R$_2$' represents hydrogen or halogen; and either
i. each of R$_3$' and R$_4$' represents halogen or —SO$_3$$^-$M$^+$, or
ii. R$_3$' represents lower alkoxy, phenoxy, amino, mono-lower alkylamino, di-lower alkylamine, phenylamino, sulphophenylamino or disulphophenylamino, and
R$_4$' represents tri-lower alkyl-ammonio,

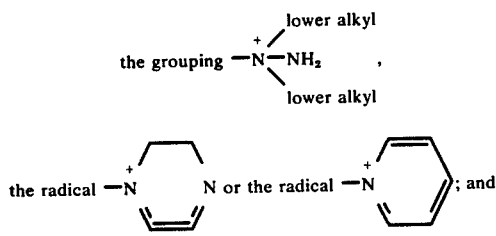

R$_5$' represents hydrogen or lower alkyl;
c. 2,3-dihalogeno-quinoxaline-6-carboxyl;
d. 2,3-dihalogeno-quinoxaline-6-sulphonyl;
e. 1,4-dihalogeno-phthalazine-6-carbonyl;
f. 2,4-dihalogeno-quinazoline-6-carbonyl;
g. 2,4-dihalogeno-quinazoline-7-carbonyl;
h. [4',5'-dihalogeno-6'-pyridanzonyl(1')]-lower alkanoyl;
i. p-[4',5'-dihalogeno-6'-pyridazonyl-(1')]-benzoyl;
j. a heterocyclic radical of the formula

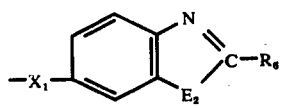

wherein
R$_6$ represents halogen or —SO$_3$—$^-$M$^+$,
X$_1$ has the same meaning as given above; and E$_2$ represents sulfur or oxygen;
k. a radical of the formula

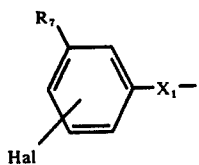

wherein R$_7$ represents nitro, lower alkylsulfonyl or sulfamoyl-phenyl, and
Hal represents fluorine or chlorine in ortho- or para-position to R$_7$, and
X$_1$ has the same meaning as above;
l. α-halogeno-lower alkanoyl;
m. α,β-dihalogeno-lower alkanoyl;
n. lower alkenoyl; or
o. halogeno-lower alkenoyl.

Another class of fiber-reactive dyes which dye the same fibers as mentioned hereinbefore in fast green shades, are those dyestuffs falling under Formula IX and having a reactive grouping as defined under (a) and in the latter, as substituent R$_4$, the grouping

wherein R' represents hydrogen or lower alkyl and D represents a benzene-azo-(1-phenyl-pyrazole) dyestuff radical linked to

via a ring carbon atom of the phenyl group in 1-position at the pyrozole nucleus, or a naphthalene-azo-benzene dyestuff radical linked to

via a ring carbon atom of the benzene moiety of said radical; or those dyestuffs falling under Formula IX and having a reactive grouping as defined under (b) wherein the substituent R$_3$' of the latter grouping is of the Formula

in which R' and D have the same meanings as above.

Particularly valuable, fiber-reactive, heavy metal-containing formazane dyes falls under Formula I which contain as fiber-reactive grouping a pyrimidine radical substituted by at least one mobile fluorine atom. These new formazane dyes, accordingly, correspond to the general formula Ia:

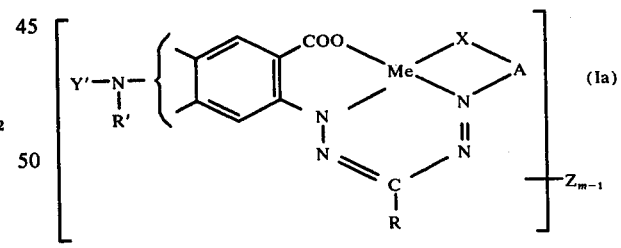

wherein
A denotes the radical of a diazo component, which contains X in the o-position to the azo bond,
X denotes a metal-binding substituent,
R denotes an, optionally substituted, aliphatic hydrocarbon radical, a cycloaliphatic radical or a carbo- or heterocyclic-aromatic radical,
R' denotes hydrogen or a lower alkyl group,
Y' denotes a pyrimidyl radical which contains at least one mobile fluorine atom and may be still further substituted, denotes a salt-forming, water-solubilizing group exhibiting acid dissociation in water,
Me denotes a heavy metal of the atomic numbers 24 to 30, and

*m* denotes a positive integer not exceeding 7.

As radical of a diazo component, A preferably belongs to the series of the aromatic carbocyclics, which may be mono- or poly-nuclear. Above all, A denotes an o-phenylene-, optionally also an o-naphthylene radical which additionally may include further ring substituents usual in azo dyes, or may be condensed with heterocyclics. In the latter case, A denotes e.g. the radical of a 1,3-benzo-oxathiole-3,3-dioxide.

As substituents in the ring A which are conventional in azo dyes, the following may be mentioned by way of example: Halogen, such as fluorine, chlorine or bromine; lower alkyl groups, such as the methyl-, ethyl-, iso-propyl- or tert-butyl group; ether groups, preferably aryloxy groups, such as the phenoxy group; lower alkylsulphonyl groups, such as the methyl- or ethylsulphonyl group; lower alkanoyl groups, such as the acetyl- or propionyl group; sulphonic-acid-amide groups, including the N-mono- and N,N-di-lower-alkyl-substituted sulphonic-acid-amide groups, for example the sulfamoyl group, sulphonic-acid-N-methyl-amide group, sulphonic-acid-N,N-di-methylamide group, sulphonic-acid-N-ethyl-amide group, sulphonic-acid-N,N-diethylamide group or the sulphonic-acid-N-propylamide group; the nitro group; the cyano group, or the β-sulphatoethyl group, the β-halogeno-ethylsulphonyl group or the β-halogeno-ethylsulphamoyl group.

As a substituent essential to the metal-complex formation, the radical A contains, in the o-position to the azo bond, a metal-binding substituent represented by X, which substituent is derived, for example, from a hydroxyl group or carboxyl group or an acid imido group, with the latter being substituted, if desired, by the radical of an organic sulphonic acid, for example.

In especially valuable dyes according to the invention, A denotes an o-phenylene radical optionally substituted by a sulphonic acid group and/or halogen, which radical, if desired, may be further substituted by a lower alkyl, nitro or cyano group or by a sulphonic acid, a lower alkylsulphonyl-, sulphamoyl-, N-mono- or N,N-di-lower-alkylsulphonic-acid-amide group, and X denotes oxygen.

Where R denotes an unsubstituted aliphatic hydrocarbon radical, such radical is, for example, a member selected from the group consisting of straight- or branched-chained alkyl- and alkenyl groups (in the latter case particularly Δ₂-alkenyl groups) having preferably up to 8 carbon atoms, such as the methyl-, ethyl-, n-propyl-, isopropyl-, allyl-, n-butyl-, sec.-butyl-, tert.butyl-, n-amyl-, tert.amyl-, n-hexyl-, n-heptyl- and n-octyl group. Each of these alkyl- and alkenyl groups may contain as substituents halogen atoms, such as fluorine or chlorine; the cyano group; a lower alkoxy group, such as the methoxy- or ethoxy group; an aralkoxy group, such as the benzyloxy group; an aryloxy group, such as the phenoxy group; a carbalkoxy group, such as the acetyloxy, propionyloxy or benzoyloxy group; a carbacyl group, such as the acetyl, the propionyl or the benzoyl group; an alkoxycarbonyl group, such as the methoxycarbonyl or the ethoxycarbonyl group; or an N,N-dialkylamino group, such as the N,N-dimethyl- or N,N-diethylamino group. The aliphatic hydrocarbon radical R may also be substituted, however, by aromatic radicals, and in that case particularly by the phenyl radical. In this case, the respective group is the benzyl- or phenethyl group, for example.

Examples of cycloaliphatic radicals usable as radical R are cycloalkyl groups with preferably 5- or 6-membered rings, particularly the cyclohexyl group.

Preferred carbocyclic-aromatic radicals usable as radical R are mono- or polynuclear aromatics, particularly the phenyl group which may contain as further ring substituents e.g. halogen, such as chlorine, but likewise fluorine or bromine; the hydroxyl, nitro or cyano group; alkyl and alkoxy groups having preferably 1 to 5 carbon atoms; N,N-di-lower-alkylamino groups; sulphonic-acid-N,N-di-lower-alkylamide groups or lower-alkylsulphonyl groups, or then also the naphthyl group.

Heterocyclic-aromatic radicals usable as radical R are particularly the pyrazolyl-2-, furyl-2-, thienyl-2-, pyridyl-3-, pyridyl-4-, quinolyl-4- and benzimidazolyl-2- radical.

Where R' denotes a lower alkyl group, the same preferably has 1 to 5 carbon atoms, examples being the methyl, ethyl, isopropyl or tert.butyl group.

In preferred formazan dyes of the formula Ia, R denotes a maximally two-nuclear carbocyclic-aromatic radical, particularly a phenyl radical which, if desired, is substituted by 1 or 2 sulphonic acid groups and/or halogen, particularly chlorine or lower alkyl groups, particularly methyl, and R' represents hydrogen.

The pyrimidyl radical Y' includes, advantageously, 1 or 2 mobile fluorine atoms and may be substituted by further monovalent substituents. Examples of such further monovalent substituents are, depending on the number of fluorine atoms; halogens, such as chlorine, bromine or fluorine; nitro or cyano groups; hydrocarbon radicals, particularly lower alkyl groups or phenyl groups, substituted alkyl groups, e.g. the trifluoromethyl group or the chloromethyl group, ether groups, particularly lower alkoxy groups or phenoxy groups which preferably may be negatively ring-substituted, thioether groups, especially lower alkylthio groups, lower alkylsulphonyl groups, optionally N-mono- or N,N-disubstituted carboxylic-acid or sulphonic-acid-amide groups, carboxylic-acid-ester groups, particularly lower alkoxycarbonyl groups, or amino groups derived from ammonia or from a primary or secondary amine, such as the amino, methylamino, ethylamino, N,N-dimethylamino, N,N-diethylamino or phenylamino group.

Preferably, Y' denotes a pyrimidyl radical of the formula:

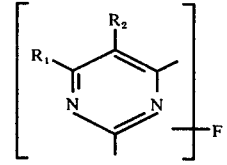

Therein:

R₁ denotes hydrogen or halogen, up to atomic No. 35, an lower alkyl radical optionally substituted by halogens, an aryl radical, particularly a phenyl radical, a carboxylic-acid-amide group, a lower alkoxy-carbonyl group or the cyano group, and R₂ denotes the same as R₁ or a sulphonic-acid-amide group, a lower alkyl-sulphonyl group or the nitro group.

Now, where R₁ and/or R₂ denote halogen, up to atomic No. 35, the same is bromine, but especially fluorine or chlorine; where it denotes a lower alkyl radical, the same preferably is the methyl radical; where it denotes a lower alkyl radical, substituted by halogens, the same is a monochloromethyl-, difluoromethyl- or trifluoromethyl radical, for example; and where it denotes an alkoxy carbonyl group, the same is the methoxycarbonyl or ethoxycarbonyl group, for example.

Where $R_2$ denotes an alkylsulfonyl group, the same is the methylsulphonyl group or ethyl-sulphonyl group, for example.

The pyrimidyl radical of the foregoing formula is derived, for example, from the following pyrimidines 2,5-dichloro-4,6-difluoropyrimidine; 2,5-dibromo-4,6-difluoro-pyrimidine; 2,4-difluoropyrimidine; 2,4-difluoro-5-chloro-pyrimidine; 2,4-difluoro-5-cyano-pyrimidine; 2,4-difluoro-5-methyl-pyrimidine; 2,4-difluoro-5-trifluoromethylpyrimidine; 2,4-difluoro-5-nitro-pyrimidine; 2,4-difluoro-5-phenyl-pyrimidine; 2,4-difluoro-5-sulfamoyl-pyrimidine; 2,4-difluoro-5-carbamoyl-pyrimidine; 2,4-difluoro-5-methylsulphonylpyrimidine; 2,4-difluoro-5-ethylsulphonylpyrimidine; 2,4-difluoro-5-carboxylic-acid-methyl-ester-pyrimidine; 2,4-difluoro-6-chloro-pyrimidine; 2,4-difluoro-6-bromo-pyrimidine; 2,4-difluoro-6-methyl-pyrimidine; 2,4-difluoro-6-cyano-pyrimidine; 2,4-difluoro-6-phenyl-pyrimidine; 2,4-difluoro-6-trifluoromethyl-pyrimidine; 2,4-difluoro-6-carbamoylpyrimidine; 2,4-difluoro-6-carboxylic-acid-methyl-ester-pyrimidine; 2,4-difluoro-5,6-dichloro-pyrimidine; 2,4-difluoro-5-chloro-6-methylpyrimidine; 2,4-difluoro-5-chloro-6-phenyl-pyrimidine; 2,4-difluoro-5-chloro-6-difluoromethyl-pyrimidine; 2,4-difluoro-5-chloro-6-trifluoromethyl-pyrimidine; 2,4-difluoro-5-chloro-6-carboxylic-acid-methyl-ester-pyrimidine; 2,4-difluoro-5,6-dibromo-pyrimidine; 2,4-difluoro-5-bromo-6-methyl-pyrimidine; 2,4-difluoro-5-bromo-6-trifluoromethyl-pyrimidine; 2,4,5-trifluoro-6-methyl-pyrimidine; 2,4-difluoro-5-nitro-6-chloro-pyrimidine; 2,4-difluoro-5-methyl-6-chloro-pyrimidine;

2,4,6-trifuoro-5-trifuoro-methyl-pyrimidine; 2,4,6-trifluoro-pyrimidine; 2,4,6-trifluoro-5-chloro-pyrimidine; 2,4,6-trifluoro-5-bromo-pyrimidine; 2,4,6-trifluoro-5-nitro-pyrimidine; 2,4,6-trifluoro-5-cyano-pyrimidine; 2,4,6-trifluoro-5-methylpyrimidine; 2,4,6-trifluoro-5-chloromethyl-pyrimidine; 2,4,6-trifluoro-5-difluoromethyl-pyrimidine; 2,4,6-trifluoro-5-carbamoyl-pyrimidine; 2,4,6-trifluoro-5-carboxylic-acid-methylester-pyrimidine; 2,4,6-trifluoro-5-carboxylic-acid-ethyl-esterpyrimidine; 2,4,6-trifluoro-5-methylsulphonyl-pyrimidine, and 2,4,5,6-tetrafluoro-pyrimidine.

Where $R_1$ and/or $R_2$ in the pyrimidyl radical of the above formula denote a halogen atom, also reaction products of those pyrimidine derivatives having mobile halogen, with organic radicals, particularly with a primary or secondary amine, which in that case contain at least one separable ammonium substituent, e.g. an N-pyridinium, an N-trialkylammonium, an N-triethylene-diammonium or an asymmetric N-dialkylhydrazinium group, may be employed, or a water-soluble dye with an acylatable amino group or an organic compound from which dyes can be formed, may be used.

Especially preferred fibre-reactive derivatives of these fluoro-pyrimidyl groups are derived from 2,4,6-trifluoropyrimidine and 2,4,6-trifluoro-5-chloropyrimidine.

The

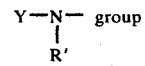

is preferably in the p-position to the nitrogen group.

As salt-forming, water-solubilizing groups exhibiting acid dissociation in water, corresponding to Z, the dyes according to the invention preferably contain sulphonic acid groups, but also phosphonic acid groups, carboxyl groups, disulphimide groups or monoester groups of polybasic acids, such as e.g. sulphate groups. Z may have, in the dye molecule, also different ones of those meanings, however.

The fiber-reactive, heavy metal-containing formazane dyes of formula Ia can be prepared by known per se methods and processes as described above; also the working-up and isolation of the fiber-reactive, heavy metal-containing formazane dyes is accomplished in accordance with conventional methods. Where desirable, the crude products are purified by dissolving and allowing to crystallize.

Especially valuable, easily accessible fibre-reactive heavy metal-containing formazane dyes according to the invention, which are distinguished by good dyeing properties, are derived from formazane dyes of formula Ia wherein A denotes an o-phenylene radical optionally substituted by a sulphonic acid group and/or halogen, which radical, if desired, may be further substituted by lower alkyl, nitro or cyano or a sulphonic acid-, a lower alkylsulphonyl-, sulphamoyl-, N-mono- or N,N-di-lower-alkyl-sulphonic-acid-amide group, X denotes oxygen, R denotes a maximally two-nuclear carboxylic-aromatic radical, particularly a phenyl radical which, if desired, is substituted by 1 or 2 sulphonic acid groups and/or halogen, particularly chlorine or lower alkyl groups, particularly methyl, R' represents hydrogen, Y' denotes the 2,6-difluoropyrimidine-4-radical or the 2,6-difluoro-5-chloro-pyrimidine-4-radical, Z denotes the sulphonic acid group, Me denotes copper or nickel, m denotes the numbers 3 through 7, especially 3 through 5 and wherein the Y-NR'-group is in the p-position to the nitrogen bond.

The fibre-reactive heavy metal-containing formazane dyes of formula Ia obtainable according to the invention find use for dyeing and printing textile and synthetic materials of whatever kind. Heavy metal-containing formazane dyes according to the invention, which do not contain any water-solubilizing groups, may be used, for example, for dyeing synthetic materials of whatever kind, such as lacquers, varnished or spinning compositions from acetyl cellulose or synthetic polyamides.

The heavy metal-containing formazane dyes according to the invention, which contain water-solubilizing groups, such as e.g. carboxylic acid groups or phosphonic acid groups, and particularly sulphonic acid groups, constitute dark powders which in the form of their alkali metal salts are very well soluble in water. They are suitable for dyeing and printing leather, paper and fibrous material, particularly fibrous material made from natural or synthetic polypeptides, such as e.g. wool, silk, synthetic polyamide and polyurethane fibres. Dyes according to the invention, which contain a sulphonic acid group, preferably a lower alkylsulphonyl- or a sulphamoyl group, exhibit a very good affinity towards wool and material exhibiting a similar dyeing behaviour, and in many cases are absorbed completely already from a neutral to weakly acid bath. Where desirable, the water-solubility of such dyes is further increased by admixing therewith anion-active or non-ionogenic wetting or dispersing agents or diluting agents.

For dyeing proteinic fiber material, the new fiber-reactive dyes preferably are employed in a weakly acid, e.g. weakly acetic-acid bath. Frequently the additions of compounds containing basic nitrogen, e.g. of polyquaternary ammonium compounds, is advisable. Due to the very high fixing rate of the new fiber-reactive dyes of formula Ia an alkaline after-treatment of the dyeings and prints on proteinic fiber material obtained therewith for improving their wet fastness properties can be dispensed with.

The new fibre-reactive formazane dyes of formula I obtainable according to the invention are particularly suitable for dyeing or printing natural or regenerated cellulose material, such as staple rayon, jute, ramie, hemp and particularly cotton. For obtaining sufficient solubility, the dyes in this case should contain in general at least 2, preferably 3 to 4, salt-forming, water-solubilizing groups exhibiting acid dissociation in water, such as sulphonic acid or carboxyl groups.

These materials are dyed in accordance with known methods with the fibre-reactive formazane dyes obtainable according to the invention. The cellulose material is impregnated or printed at a low temperature, e.g. at 20° to 50° C with the, optionally thickened, dye solution, and the dye is then fixed by treatment with acid-binding agents. Examples of such agents which may be employed are sodium carbonate, potassium carbonate, di- and tri-sodium phosphate, caustic soda solution, also potassium- or sodium bicarbonate when using temperatures above 50° C. Instead of subjecting the impregnated materials to an alkaline aftertreatment, the acid-binding agent, preferably in the form of alkali carbonates, in many cases can be added already to the impregnating liquors or printing pastes, and development of the dyeing can then be effected by short heating or steaming at temperatures above 100° C to 160° C or by storing at room temperature for a relatively extended period of time. The addition of hydrotropic agents to the printing pastes and impregnating liquors is advantageous in this process, e.g. the addition of urea in amounts of 10 to 200 g per liter of dye liquor.

Moreover, cellulose material can be dyed with dyes according to the invention by the exhaustion method by introducing the cellulose to be dyed into the dyeing bath which contains an acid-binding agent and, if desired, also neutral salts, such as e.g. sodium chloride or sodium sulphate, with using a dilute dye liquor and a slightly elevated temperature, gradually heating the dyeing bath to a temperature of 40° to 100° C, and bringing the dyeing process to its end at this temperature. If desired, the neutral salts which accelerate the exhaustion of the dye also may be added to the bath only after the dyeing temperature proper has been reached.

By the treatment with acid-binding agents, the new formazane dyes are chemically bonded to the fibre, and particularly the cellulose dyeings, after soaping to remove any unfixed dye, exhibit excellent fastness to wetting.

The fibre-reactive dyes according to the invention of formula Ia are distinguished by their colour intensity, by their pure colour tones and particularly by their high reactivity. What is surprising in this connection is that, in spite of the high reactivity of the new dyes, the dyed and printed preparations obtainable therewith are very stable, and further that the dyeings and printings produced therewith exhibit a good stability, particularly when subjected to acid- and alkali hydrolysis. The intensely coloured dyeings produced with the dyes according to the invention are violet, blue to green. They further are distinguished by very good fastness to light and rubbing and excellent fastnesses to wetting, such as e.g. good fastnesses to washing, alkali, milling and perspiration. Moreover, the dyeings are uniform and exhibit an unexpectedly high fastness to injuring effects due to boiling. Finally, reactive dyes according to the invention exhibit a high fixing yield even at low temperatures (10°–50° C); any unfixed dye can be washed out very easily, what is one of the essential prerequisites for good fastnesses to wetting, and the dyeings are stable to the conventional synthetic resin finishes.

Furthermore, there are obtained, according to another aspect, fiber-reactive formazane dyes which also contain as fiber-reactive radical a pyrimidyl radical bearing at least one mobile fluorine atom. These dyes correspond to the general formula Ib

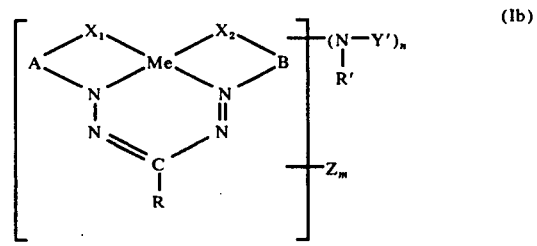

They are distinguished by pure colour tones and good overall fastnesses of the dyeings or printings produced therewith on organic materials, especially such organic materials made from cellulose or polyamide. In this formula Ib:

R denotes a monovalent organic radical, particularly a nucleophilic radical, for example a monovalent aromatic-carbocyclic or aromatic-heterocyclic radical, a nitro, cyano, carbacyl or carbalkoxy group; preferably an aromatic-carbocyclic radical optionally substituted by sulphonic acid groups and/or halogen and lower alkyl groups;

A and B each denote the radical of a diazo component, particularly of the aromatic-carbocyclic or aromatic-heterocyclic series, especially an one- or dinuclear aromatic-carbocyclic radical optionally substituted by halogen, lower alkyl, sulphamoyl, lower alkylsulphonyl, nitro or the sulphonic acid group and preferably a phenyl radical which is substituted by a sulphonic acid group, which radicals contain $X_1$ resp. $X_2$ in the o-position to the nitrogen bond;

$X_1$ and $X_2$ each denote a metal-binding substituent, preferably both $X_1$ and $X_2$ represent O, or both $X_1$ and $X_2$ represent —COO— or $X_1$ is —COO— and $X_2$ is O;

Z denotes a salt-forming, water-solubilizing group exhibiting acid dissociation in water, e.g. a phosphonic acid group or an acylated sulphamide group, preferably a group ($-X_1O^-M^+M$) wherein $X_1$ represents —$SO_2$— or —CO— and $M^+$ represents the equivalent of a colorless cation dissociable in water which Z optionally also having, in the dye molecule, different ones of those meanings;

Y denotes a pyrimidyl group which includes at least one mobile fluorine atom and may be still further substituted;

R' denotes hydrogen or a lower alkyl group especially the methyl and ethyl group;

Me denotes a heavy metal of atomic numbers 24–29, preferably copper, or also nickel, cobalt or chromium;

m denotes a positive integer from 1 to 5, preferably 2 to 4, and n denotes a positive integer not exceeding 2, preferably 1.

NR'—Y' must be linked to a carbon atom of
a. B when $X_1$ is —COO— and $X_2$ is O,
b. A or B when both $X_1$ and $X_2$ are O, and
c. A, B or R when both $X_1$ and $X_2$ are —COO—.

The pyrimidyl group Y' and also the pyrimidines from which this pyrimidyl group is derived signifies in this case the same as mentioned above.

The new formazane dyes of formula Ib according to the invention are obtained by various methods. One method consists in that a metal-containing formazan dye of the formula Iab:

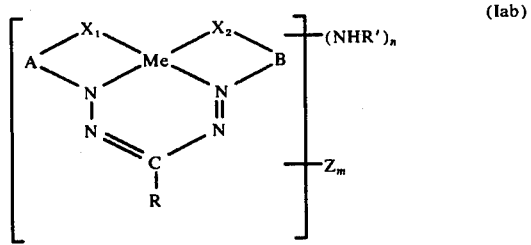
(Iab)

in which the symbols have the meaning given in formula Ib, is reacted with a pyrimidine compound which includes more than one mobile fluorine atom, and may be still further substituted.

The starting substances employed according to the invention of formula Iab are obtained by known per se methods, for example by coupling 1 mol of an o-hydroxy-aryldiazonium compound with an α-aryl-α-acylacetic ester, e.g. with an α-phenyl-α-formylacetic-acid-alkyl ester, thereafter saponifying the carbalkoxy group to the carboxyl group in an alkaline medium, and subjecting to the action of a second molecule of the same or a different o-carboxy- or o-hydroxyaryl-diazonium compound, with selecting the starting substances so that at least one of them includes an acylatable amino group or a substituent convertible into an acylatable amino group. Suitably, the initial product contains at least one acylamino group, either in the radical of one or the other diazo component A or B or in the monovalent organic radical R, particularly where R is represented by an aryl radical. After metallization with a metal-introducing agent, this acylamino group is then saponified in an alkaline medium to form a acylatable amino group. As compounds which introduce the fiber-reactive radical Y the above named pyrimidines are used which are known and can be prepared by known methods.

The conditions of the reaction of the metal-containing formazane dye of the formula Iab with the pyrimidines have to be selected so as to prevent premature exchange of mobile groups due to either an excessively high pH value of the reaction medium or an excessively high temperature. To this end, one employs for the reaction the aqueous solutions of the alkali metal salts of the metal-containing formazan dyes and carries out the reaction at as low temperatures and pH values as possible, if desirable in the presence of mineral acid-neutralizing agents, such as alkali metal salts of lower fatty acids, i.e. at pH values of about 2–7 and at temperatures of 0° to about 60° C., depending upon the stability of the pyrimidines resp. the mobility of the exchangeable substituent. The pyrimidines are employed in at least equimolecular amount, respectively where two acylatable amino groups are present, with a multiple amount corresponding to the number of such amino groups, in finely dispersed form, e.g. in the form of a suspension or emulsions, if desired with the aid of inert, easily removable organic solvents, such as lower ketones, e.g. acetone. The pyrimidine is allowed to act until the amino groups of formula Ia to be acylated are not any more detectable; a reaction where primary amino groups can be shown consists e.g. in diazotation and following coupling of the primary amino groups with the sodium salt of 2-naphthol-3,6-disulphonic acid.

The isolation and drying of the formazane dyes according to the invention must likewise be done with care, e.g. by salting out the alkali metal salts with sodium chloride in weakly acid solution filtering and by drying at moderately elevated temperature preferably in a vacuum.

Another method for the preparation of the new fibre-reactive, heavy metal-containing formazane dyes of formula Ib consists in that a dye of the general formula IIb:

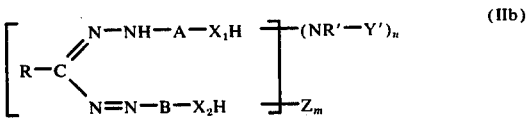
(IIb)

wherein R, A, B, Y, Z, R', m and n have the meanings given under formula Ib, and $X_1H$ and $X_2H$ denotes metallizable groups especially the hydroxyl- or carboxyl group is reacted with an agent introducing heavy metal Me of atomic numbers 24–29. Advantageously, one employs such dyes of formula IIb, which as group Y contains a 2,6-difluoro-pyrimidyl-4- or a 2,6-difluoro-5-chloro-pyrimidyl-4-radical.

The metal-free dyes of formula IIb are prepared, for example, from components which contain at least one substituent —NR'—Y' as defined, with taking care of the precautional provisions indicated in the first-mentioned method with a view to the mobility of critical substituents, or one introduces the pyrimidyl radical as defined into dyes which include an acylatable amino group, or a group convertible into an acylatable amino group, the introduction in the latter case being carried out after conversion into the acylatable amino group.

For the metallization of the metal-free dyes of the general formula IIb, the usual metal-delivering agents are employed, e.g. mineral acid salts of cobalt, nickel or chromium, preferably of copper, suitably in the presence of alkyli metal salts of lower fatty acids or of polybasic oxygen acids of phosphorus as mineral acid-neutralizing agents, at moderately high temperatures and pH values of about 1–7, in order to minimize premature exchange of mobile substituents. In performing the isolation and drying of the dyes, the precautional provisions mentioned under the 1st method must likewise be taken care of.

The starting materials of formulae Iab and IIb are obtained, for example, in that a hydrazone derived from an aromatic aldehyde and o-carboxyarylhydrazine is coupled with an o-carboxy-, 0-hydroxy- or o-acyloxyaryldiazonium compound, with the components again being selected so that the starting dye contains the acylatable amino group or a substituent convertible into an acylatable amino group, which in any suitable stage of the dye synthesis is converted into an acylatable amino group and acylated with the pyrimidine in accordance with the invention. Further, organic compounds containing activated methylene groups may also be coupled directly with 2 mols of such aryldiazo compounds as contain in the o-position to the diazo group a complex-forming group or a substituent convertible into a complex-forming group, e.g. an acetyloxy or tosyloxy group which prior to or during the metallization is saponified to the hydroxyl group, whereby the components again have to be selected so that in the metal-containing starting dye there is present an acylatable amino group resp. the starting dye to be metallized a group —NR'—Y according to the invention. Examples of suitable coupling components are: nitroalkanes, such as nitromethane, α-carbonylalkanes, such as acetone, methyiethylketone, acetophenone, chloroacetophenones, nitroacetophenones, acylaminoacetophenones, acylacetic acid derivatives, such as acetoacetic ester, benzoylacetic ester, oxalacetic ester, derivatives of malonic acid, such as the esters or amides thereof, methylene compounds activated by cyano and carbonyl groups, such as the derivatives of cyanoacetic acid, furthermore azolium salts containing activated methyl groups, e.g. the 2,3-dimethylbenzothiazolium salts or the 1,2,3-trimethylbenzimidazolium salts.

A further third method for the preparation of fibre-reactive, heavy metal-containing formazane dyes of formula Ib according to the invention consists in that a metallizable compound of the general formula IIIb

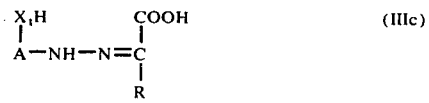

(IIIc)

wherein $X_1H$ denotes a metallizable group in the o-position to the nitrogen bond and R and A have the meanings given under formula IIb, is first treated with an agent introducing a heavy metal Me of atomic numbers 24 to 29 and then is coupled with an aryldiazonium compound, particularly an aryldiazonium compound which contains a 2,6-difluoro-pyrimidyl-4-radical or a 2,6-difluoro-5-chloro-pyrimidyl-4-radical, bonded through an amino group, which aryldiazonium compound contains a metallizable substituent $X_2H$ in the o-position to the diazonium group, to form a fibre-reactive, heavy metal-containing formazane dye of formula Ib, with the starting components being selected so that they altogether contain at least 1 and no more than 5 groups Z and at least 1 group —NR'—Y' of the meaning given under formula Ib.

The starting compounds of formula IIIb are obtained e.g. by coupling 1 mol of an aryldiazonium compound with a methylene or methine compound which after coupling still contain on the methine C-atom a carboxyl group or a substituent convertible into a carboxyl group, such as e.g. a cyano- or carboxylic acid ester group.

The metallization and the second coupling may be carried out, if desired, also in one single process operation. Diazo and azo components which may be employed for this process have been defined already further above as starting substances for the first and second processes according to the invention.

The new heavy metal-containing formazane dyes of formula Ib are dark powders which in the form of their alkali metal salts are very well soluble in water. They are suitable for dyeing and printing organic materials, particularly natural and regenerated cellulose fibres, in red-brown, violet, blue-violet, blue, navy blue, green to gray tones. The cellulose material suitably is impregnated or printed at a low temperature, e.g. at 20° – 50° C., with the, optionally thickened, dye solution, and the dye is then fixed by treatment with acid-binding agents. Examples of such agents which may be employed are sodium carbonate, di- and trisodium phosphate, caustic soda solution, also sodium bicarbonate when using temperatures above 50° C. Although the treatment with these agents may be carried out already at room temperature or at a slightly elevated temperature, such treatment often is carried out (advantageously after a mild intermediate drying of the impregnated or printed material) with better success at an elevated temperature, e.g. at 70° to 160° C. Instead of carrying out an alkaline aftertreatment, one may also, especially where hot fixing is employed, add the acid-binding agent, preferably in the form of alkalibicarbonates, already to the impregnating liquors or printing pastes, and then effect development of the dyeing by short heating or steaming at temperatures above 100° C. – 160° C. The addition of hydrotropic agents to the printing inks and impregnating liquors is advantageous in this procedure, e.g. the addition of urea in amounts of 10 – 200 g per liter of dye composition.

By the treatment with acid-binding agents, the new fibre-reactive dyes are chemically bonded to the fibre, and particularly the cellulose dyeings, after soaping to remove any unfixed dye, exhibit excellent fastness to wetting.

Natural and synthetic polyamide fibers suitably are dyed in an acid bath or are printed with neutral to weakly acid printing inks.

Due to the very high fixing rate of the new fiber-reactive dyes of formula Ib an alkaline after-treatment of the dyeings and prints on proteinic fiber material obtained therewith for improving their wet fastness properties can be dispensed with.

The fiber-reactive formazane dyes of formula Ib are distinguished by their colour intensity, by their pure colour tones and particularly by their high reactivity. What is surprising in this connection is that, in spite of the high reactivity of the new dyes, the dyeing and printing preparations obtainable therewith are very stable, and furthermore that the dyeings and printings produced therewith exhibit a good stability, particularly when subjected to acid- and alkali hydrolysis. The intensely coloured dyeings produced with the dyes according to the invention are further distinguished by very good fastness to light and rubbing and excellent fastnesses to wetting, such as e.g. good fastnesses to washing, alkali, milling and perspiration. Moreover, the dyeings are uniform and exhibit an unexpectedly high fastness to injuring effects due to boiling. Finally, reactive dyes according to the invention exhibit a high fixing yield even at low temperatures (10°–50° C.); any unfixed dye can be washed out very easily, what is one of the essential prerequisites for good fastnesses to wetting, and the dyeings are stable to the conventional synthetic resin finishes.

The invention is further illustrated by the following non-limitative examples in which temperatures are given in degrees Centigrade and all percentages are by weight unless expressly stated otherwise.

In these examples, formulae show the free acid forms of the dyestuffs, while in the production as described in the examples the sodium salts or if potassium chloride is used instead of sodium chloride in their preparation the potassium salts are obtained.

EXAMPLE 1

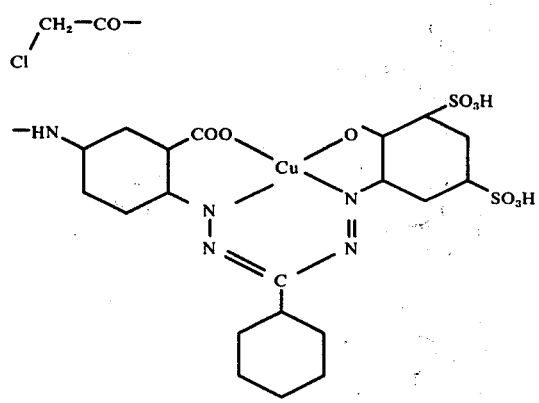

22.9 g of 2-amino-5-chloro-acetylaminobenzoic acid are dissolved in 300 ml of water with a neutral reaction and, at 0°–10°, the solution is diazotised with 6.9 g of sodium nitrite and 40 ml of 10N hydrochloric acid with the addition of ice. The diazonium suspension is then added dropwise to a suspension of 20.4 g of phenylformyl acetic acid ethyl ester in 200 ml of water, 250 ml of dioxane and 10.5 ml of 10N sodium hydroxide solution, the addition being made at 0°–10°. The reaction mixture is always kept phenolphthalein alkaline during the addition of the diazonium compound by sprinkling in sodium carbonate. On completion of the coupling, the coupling mixture is heated to 30°–35°, 10.5 ml of 10N sodium hydroxide solution are added and the whole is stirred for 3 hours at 30°–35° after which the ester group has been completely saponified. The solution of the saponification product formed is then made acid to litmus paper with acetic acid, 15 g of sodium acetate and 100 ml of 1 molar copper sulphate solution are added and then, at 0°–5°, the diazonium suspension, obtained by diazotisation of 26.9 g of 2-hydroxy-1-aminobenzene-3,5-disulphonic acid with 30 ml of hydrochloric acid and 6.9 g of sodium nitrite, is added in portions. The copper complex of the formula given above is formed. This is precipitated by the addition of sodium chloride, filtered off, washed with dilute sodium chloride solution and dried in vacuo at 80°.

It is a dark powder which dissolves in water with a blue colour. It dyes natural and synthetic polyamide fibres from an acetic acid bath in pure greenish blue shades which are very fast to light and wet.

Dyestuffs having similar properties are obtained if, with otherwise the same procedure, instead of the components used in the above Example 1, equivalent amounts of each of the components given in the columns II, III, IV and V of the following Table I are used. The shades of the dyeings on natural and synthetic polyamide with the corresponding formazane metal complexes are given in the last column.

Table I

| No. | 1st diazo component | coupling component | 2nd diazo compound | complex-forming metal | shade on natural and synthetic polyamide fibres |
|---|---|---|---|---|---|
| 1 | ClCH$_2$COHN—⟨⟩—NH$_2$ with COOH | OHC\CH/COOC$_2$H$_5$ with cyclohexyl | HO$_3$S—⟨⟩—NH$_2$ with OH and SO$_2$CH$_3$ | Cu | greenish blue |
| 2 | " | " | HO$_3$S—⟨⟩—NH$_2$ with OH and Cl | " | " |
| 3 | " | OHC\CH/COOC$_2$H$_5$ with cyclohexyl-Cl | ⟨⟩—NH$_2$ with OH and SO$_3$H | " | blue |
| 4 | " | OHC\CH/COOC$_2$H$_5$ with cyclohexyl-Cl | O$_2$N—⟨⟩—NH$_2$ with OH and SO$_3$H | " | greenish blue |

Table I-continued

| No. | 1st diazo component | coupling component | 2nd diazo compound | complex-forming metal | shade on natural and synthetic polyamide fibres |
|---|---|---|---|---|---|
| 5 | BrCH$_2$CONH—C$_6$H$_9$(COOH)(NH$_2$) | OHC—CH(C$_6$H$_{11}$)—COOC$_2$H$_5$ | C$_6$H$_9$(OH)(NH$_2$)(SO$_2$NH$_2$) | Co | " |
| 6 | CH$_2$=C(Br)—CONH—C$_6$H$_9$(NH$_2$)(COOH) | " | C$_6$H$_9$(OH)(NH$_2$) | Cr | green |
| 7 | CH$_2$BrCHBrCONH—C$_6$H$_9$(COOH)(NH$_2$) | " | C$_6$H$_9$(OH)(NH$_2$)(SO$_2$CH$_3$) | Cr | " |
| 8 | " | " | C$_6$H$_9$(OH)(NH$_2$) | Co | bluish green |
| 9 | ClCH$_2$CONH—C$_6$H$_9$(NH$_2$)(COOH) | " | C$_6$H$_8$(OH)(NH$_2$)(NO$_2$)(SO$_2$C$_2$H$_5$) | Cu | blue |
| 10 | " | " | C$_{10}$H$_{13}$(NH$_2$)(OH)(NO$_2$)(SO$_3$H) | Cu | green |
| 11 | (2,4,5-trichloro-1,3,5-triazinyl)NH—C$_6$H$_9$(NH$_2$)(COOH) | " | C$_6$H$_9$(OH)(NH$_2$)(SO$_2$CH$_2$CH$_2$OSO$_3$H) | Cu | blue on cotton |
| 12 | CH$_3$—C(Cl)=CH—CONH—C$_6$H$_9$(NH$_2$)(COOH) | " | C$_6$H$_9$(OH)(NH$_2$)(SO$_2$NHCH$_2$CH$_2$OSO$_3$H) | Cu | " |
| 13 | " | OHC—CH(CH$_2$C$_6$H$_{11}$)—COOC$_2$H$_5$ | " | Cu | " |

Table I-continued

| No. | 1st diazo component | coupling component | 2nd diazo compound | complex-forming metal | shade on natural and synthetic polyamide fibres |
|---|---|---|---|---|---|
| 14 | Cl-CH₂CONH-[ring]-COOH, NH₂ | OHC-CH(COOC₂H₅)-[cyclohexyl] | HO₃S-[ring(OH)(NH₂)]-SO₂N(CH₃)₂ | Cu | greenish blue |
| 15 | '' | '' | HO₃S-[ring(OH)(NH₂)]-SO₂NH-C₃H₇ | '' | '' |
| 16 | '' | OHC-CH(COOC₂H₅)-[cyclohexyl-Cl] | Cl-[ring(OH)(NH₂)]-SO₃H | '' | blue |
| 17 | '' | OHC-CH(COOC₂H₅)-[cyclohexyl-Cl,Cl] | NO-[ring(OH)(NH₂)]-SO₃H | '' | greenish blue |
| 18 | '' | OHC-CH(COOC₂H₅)-[cyclohexyl] | Br-[ring(OH)(NH₂)]-SO₃H | Co | '' |
| 19 | '' | '' | HO₃S-[ring(OH)(NH₂)]-O-C₆H₅ | Cr | green |
| 20 | '' | '' | HO₃S-[ring(OH)(NH₂)]-COOH | Cr | '' |
| 21 | '' | '' | [ring(OH)(NH₂)]-CO-CH₃ | Co | blueish green |

EXAMPLE 2

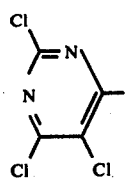

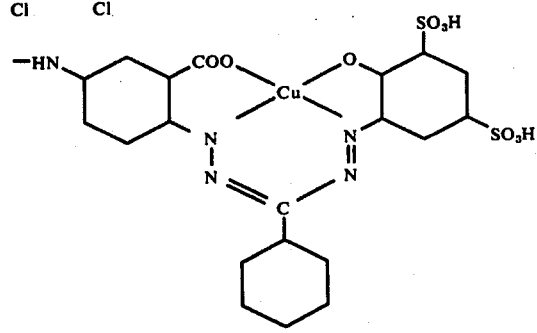

63.8 g of the dyestuff obtained from 2-amino-5-acetylaminobenzoic acid, phenylformyl acetic acid ethyl ester, copper sulphate and 2-hydroxy-1-aminobenzene-3,5-disulphonic acid as described in Example 1 are dissolved in 1000 ml of 90°–95° hot water with a neutral reaction, 50 g of sodium hydroxide and 100 ml of dioxane are added and the whole is stirred for 5 hours at 95°–98°. The copper complex of the amino formazane dyestuff formed is precipitated from the hot solution by the addition of sodium chloride, cooled to 20° to 25° while stirring, filtered off and the filter residue is again dissolved in 800 ml of 60 to 65° hot water. At this temperature, 21.8 g of 2,4,5,6-tetrachloropyrimidine are sprinkled in within 1 hour while stirring, the pH of the reaction mixture always being kept at 6.0 – 6.5 by simultaneous addition of sodium carbonate. As soon as no more free amino groups can be traced, the reactive dyestuff formed of the above formula is precipitated with sodium chloride, filtered off, washed with sodium chloride solution and dried in vacuo at 80° to 85°.

It is a dark powder which dissolves in water with a blue colour.

From a long bath in the presence of an acid binding agent, it dyes natural or regenerated cellulose fibres in pure greenish blue shades which, after a treatment with boiling soap solution, are very light and wet fast.

Dyestuffs having similar properties are obtained, if the formazane dyestuffs produced by the method of Example 1, obtained by using equivalent amounts of the components given in columns II, III, IV, and V of the following Table II, are saponified as described in Example 2 and then reacted with equivalent amounts of the acylating agents given in column VI. The shades of the dyeings on cellulose obtained with the corresponding reactive formazane complexes are given in the last column.

Table II

| No. | 1st diazo component | coupling component | 2nd diazo component | complex-forming metal | acylating agent | shade on cellulose fibres |
|---|---|---|---|---|---|---|
| 1 | $CH_3CONH-$ substituted cyclohexane with COOH and $NH_2$ | $OHC-CH(COOC_2H_5)$-cyclohexyl | $HO_3S$-, $OH$, $NH_2$, $SO_2CH_3$ substituted ring | Cu | 2,4,5,6-tetrachloropyrimidine | greenish blue |
| 2 | " | " | $HO_3S$-, $OH$, $NH_2$, $SO_2C_2H_5$ substituted ring | " | 2,4,6-trichloro-1,3,5-triazine | " |
| 3 | " | " | $HO_3S$-, $OH$, $NH_2$, $SO_2N(C_2H_5)_2$ substituted ring | " | dichlorotriazinyl-NH-cyclohexyl-$SO_3H$ | " |
| 4 | " | $OHC-CH(COOC_2H_5)$-cyclohexyl-Cl | $HO_3S$-, $OH$, $NH_2$, $SO_3H$ substituted ring | " | $Cl-CO-CH=C(Cl)-CH_3$ | " |
| 5 | $CH_3OCONH-$ substituted cyclohexane with COOH and $NH_2$ | " | Cl-, $OH$, $NH_2$, $SO_3H$ substituted ring | " | $Cl-CO-CH(Br)-CH_2-Br$ | " |
| 6 | " | $OHC-CH(COOC_2H_5)$-cyclohexyl-Cl, Cl | $HO_3S$-, $OH$, $NH_2$, $SO_3H$ substituted ring | " | dichloroquinoxaline carbonyl chloride | " |
| 7 | " | $OHC-CH(COOC_2H_5)$-cyclohexyl | $OH$, $NH_2$, $SO_2NH_2$ substituted ring | Ni | $Cl-CO-CHF-CF_2-CH_2F$ (tetrafluoro) | violet |
| 8 | $CH_3CONH-$ substituted cyclohexane with COOH and $NH_2$ | " | $HO_3S$-, $OH$, $NH_2$, $SO_3H$ substituted ring | Cu | 4,6-dichloropyrimidine-2-carbonyl chloride | greenish blue |

Table II-continued

| No. | 1st diazo component | coupling component | 2nd diazo component | complex-forming metal | acylating agent | shade on cellulose fibres |
|---|---|---|---|---|---|---|
| 9 | " | OHC–CH(cyclohexyl)–COOC₂H₅ | cyclohexane with OH, NO₂, NH₂, SO₃H | " | dichlorotriazinyl-NH-cyclohexane-disulfonic acid | " |
| 10 | CH₃CONH–cyclohexane with NH₂, CH₃, COOH | OHC–CH(cyclohexyl)–COOC₂H₅ | cyclohexane with OH, HO₃S, NH₂, CH₃ | " | dichlorotriazinyl-NH-cyclohexane-CH₃-N=N-decalin-(SO₃H)₂ | green |
| 11 | " | " | cyclohexane with OH, HO₃S, NH₂, SO₂CH₃ | " | cyclohexyl-CH₃-NH-dichlorotriazinyl-N-N=C(COOH)-C(OH)=N-N=cyclohexane-(SO₃H)₂ | " |
| 12 | " | OHC–CH(chlorocyclohexyl)–COOC₂H₅ | cyclohexane with OH, HO₃S, NH₂, SO₃H | " | ClOC–cyclohexane with F, NO₂ | blue |
| 13 | " | OHC–CH(chlorocyclohexyl)–COOC₂H₅ | " | " | ClOC–cyclohexane with F, SO₂CH₃ | " |
| 14 | " | OHC–CH(cyclohexyl)–COOC₂H₅ | " | " | ClOC–cyclohexane with F, SO₂N(CH₃)₂ | " |
| 15 | " | " | " | " | ClOC–cyclohexane–N=C(Cl)–S | " |
| 16 | " | " | cyclohexane with OH, HO₃S, NH₂, SO₂CH₃ | " | ClOC–cyclohexane–N=C(SO₃H)–O | " |
| 17 | " | " | cyclohexane with OH, HO₃S, NH₂, SO₃H | " | ClOC–cyclohexane–pyrimidine(Cl,Cl) | " |

Table II-continued

| No. | 1st diazo component | coupling component | 2nd diazo component | complex-forming metal | acylating agent | shade on cellulose fibres |
|---|---|---|---|---|---|---|
| 18 | " | " | " | " | 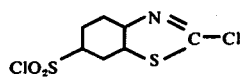 | " |
| 19 | " | 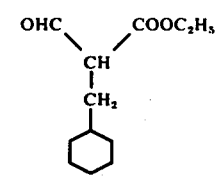 | " | " | 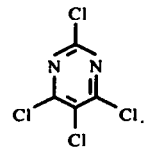 | " |
| 19a | 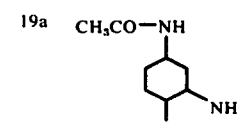 | 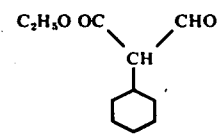 | " | " | " | " |

EXAMPLE 3

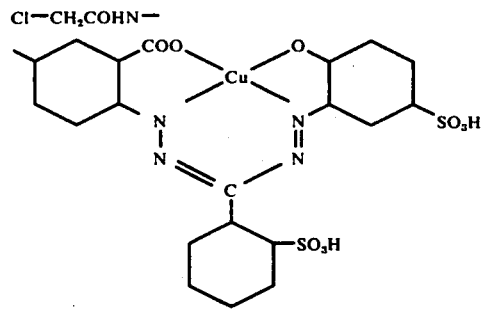

41.1 g of the aryl hydrazone, obtained by condensation of 2-hydrazino-5-chloro-acetylaminobenzoic acid with benzaldehyde-2-sulphonic acid, are slurried in 500 ml of 20°–25° warm water and dissolved with aqueous sodium hydroxide solution at pH 8.0–8.5. After adding 40 g of sodium carbonate, 100 ml of an aqueous 1 m copper sulphate solution and the aqueous diazo suspension, obtained by diazotisation of 18.9 g of 2-hydroxy-1-aminobenzene-5-sulphonic acid, are poured in simultaneously. As soon as the coupling is complete, the reaction mixture is heated to 60°–65°, 100 ml of 25% ammonia are added and the whole is stirred for 3 hours at 60°–65°. The copper complex of the above formula is formed. It is precipitated by the addition of sodium chloride, filtered off, washed with dilute sodium chloride solution and then dried in vacuo at 80°.

It is a dark powder which dissolves in water with a blue colour.

It dyes natural and synthetic polyamide fibres from a weakly acid bath in pure reddish blue shades which are very light and wet fast.

Dyestuffs having similar properties are obtained if instead of the components used in the Example, equivalent amounts of the components given in columns II, III, IV and V of the following Table III are used and otherwise the procedure described in the Example is followed. The shade of the dyeings obtained on natural and synthetic fibres with the corresponding formazane dyestuffs is given in the last column.

Table III

| No. | hydrazone from hydrazine component | hydrazone from formyl component | diazo component | complex-forming metal | shade on natural and synthetic polyamide fibres |
|---|---|---|---|---|---|
| 1 | 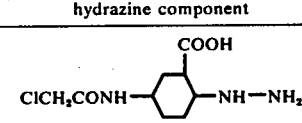 | 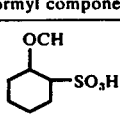 | 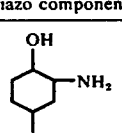 | Cu | reddish blue |
| 2 | " | " | 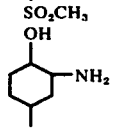 | Co | green |
| 3 | " | 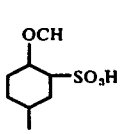 | 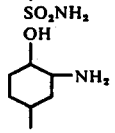 | Cu | reddish blue |

Table III-continued

| No. | hydrazone from hydrazine component | hydrazone from formyl component | diazo component | complex-forming metal | shade on natural and synthetic polyamide fibres |
|---|---|---|---|---|---|
| 4 | " | [OCH, Cl, HO₃S substituted cyclohexane] | [OH, NH₂, HO₃S, SO₂CH₃ substituted cyclohexane] | Cu | greenish blue |
| 5 | " | [OCH, SO₃H substituted cyclohexane] | [OH, NH₂ substituted cyclohexane] | Cr | green |
| 6 | Br Br CH₂CH—CONH—[cyclohexane]—NH—NH₂ with COOH | [OCH, SO₃H substituted cyclohexane] | [OH, NH₂, HO₃S, NO₂ substituted cyclohexane] | Cu | reddish blue |
| 7 | ClCH₂—CO—NH—[cyclohexane]—NH—NH₂ with COOH | [OCH, Cl, HO₃S substituted cyclohexane] | [OH, NH₂, O₂N substituted cyclohexane] | Cu | reddish blue |
| 8 | " | [OCH, OH substituted cyclohexane] | [NH₂, OH, HO₃S, SO₃H substituted naphthalene] | Cu | green |
| 9 | " | " | [OH, NH₂, HO₃S substituted cyclohexane] | Cu | blue |
| 10 | " | [OCH, SO₃H substituted cyclohexane] | [OH, NH₂, HO₃S, CH₃ substituted cyclohexane] | Cu | " |
| 11 | " | [OCH—CH₂—O—cyclohexane] | [OH, NH₂, O₂N, SO₂—CH₂—CH₂—O—SO₃H substituted cyclohexane] | Cu | blue on cotton |
| 12 | " | [OCH—CH₂—CH₃] | [OH, NH₂, SO₂—NH—CH₂—CH₂—O—SO₃H substituted cyclohexane] | Cu | " |
| 13 | Cl—CH₂—CONH—[cyclohexane]—NH—NH₂ with COOH | [OCH substituted pyridine] | [OH, NH₂, SO₂CH₃ substituted cyclohexane] | Cu | blue |
| 14 | Cl—CH₂—CO—N(CH₃)—[cyclohexane]—NH—NH₂ with COOH | [OCH=CH—CH₃] | [OH, NH₂, HO₃S, SO₂NH—CH₂CH₂CH₃ substituted cyclohexane] | Co | " |

Table III-continued

| No. | hydrazone from hydrazine component | hydrazone from formyl component | diazo component | complex-forming metal | shade on natural and synthetic polyamide fibres |
|---|---|---|---|---|---|
| 15 | " | 2-furyl-OCH (furan with OCH) | 4-chloro-2-amino-phenol-6-sulfonic acid (OH, NH₂, Cl, HO₃S on benzene) | Cu | grey |
| 16 | " | 2-thienyl-OCH (thiophene with OCH) | 2-amino-4-(ethylsulfonyl)phenol-6-sulfonic acid (OH, NH₂, SO₂C₂H₅, HO₃S) | Cu | greenish blue |
| 17 | " | cyclohexyl-OCH (with H) | 2-amino-phenol-4-sulfonic acid (OH, NH₂, HO₃S) | Cr | blue |
| 18 | " | 4-quinolyl-OCH | 2-amino-4-nitro-phenol-6-sulfonic acid (OH, NH₂, NO₂, HO₃S) | Cu | blue |
| 19 | ClCH₂—CONH—[cyclohexyl with COOH]—NH—NH₂ | CH₃—(CH₂)₆—OCH | 2-amino-phenol-4-sulfonic acid (OH, NH₂, HO₃S) | Cu | blue |
| 20 | Br—CH₂—CO—N(C₂H₅)—[cyclohexyl with COOH]—NH—NH₂ | (CH₃)₂CH—OCH | 1-amino-2-hydroxy-naphthalene-4,6-disulfonic acid (NH₂, OH, HO₃S, SO₃H) | Cu | blue |
| 21 | " | 2-benzimidazolyl-CHO | 2-amino-phenol-4-sulfonic acid (OH, NH₂, HO₃S) | Cu | " |
| 22 | " | CH₃—OCH | 2-amino-6-methyl-phenol-4-sulfonic acid (OH, NH₂, CH₃, HO₃S) | Cu | " |
| 23 | Cl-CH₂CONH—[cyclohexyl with COOH]—NH—NH₂ | C₂H₅O—CH₂—OCH | 2-amino-6-nitro-4-[2-(sulfatoethyl)sulfonyl]phenol (OH, NH₂, O₂N, SO₂CH₂CH₂O—SO₃H) | Cu | " |
| 24 | " | NC—CH₂—CH₂—OCH | 2-amino-4-[N-(2-sulfatoethyl)sulfamoyl]phenol (OH, NH₂, SO₂NH—CH₂CH₂—O—SO₃H) | Cu | " |

EXAMPLE 4

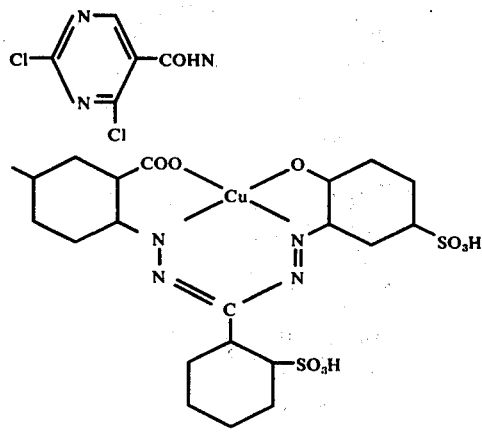

63.8 g of the dyestuff obtained from 2-hydrazino-5-acetylaminobenzoic acid, benzaldehyde-2-sulphonic acid, copper sulphate and 2-hydroxy-1-aminobenzene-5-sulphonic acid according to Example 3 (corresponding to 1/10 mol), in the form of the sodium salt, are dissolved in 1000 ml of 90°-95° hot water, 50 g of sodium hydroxide are added and the whole is stirred for 5 hours at 95°-98° after which the acetylamino group has been completely saponified. The copper complex of the amino formazane dyestuff formed is precipitated with sodium chloride, filtered off at 20°-25°, washed with dilute sodium chloride solution and again dissolved in 1000 ml of 30°-35° warm water. After cooling the solution to 0°-5°, 21.2 g of 2,4-dichloropyrimidine-5-carboxylic acid chloride are added dropwise within 1 hour, the pH of the reaction mixture always being kept at 6.0 – 6.5 by the simultaneous addition dropwise of aqueous sodium carbonate. As soon as no more free amino groups can be traced, the reactive dyestuff obtained of the above formula is precipitated with sodium chloride, filtered off, washed with sodium chloride solution and dried in vacuo at 40°-45°. It is a dark powder which dissolves in water with a blue colour.

If cotton is pad dyed with a solution containing 20 g of the above dyestuff, 10 g of sodium bicarbonate and 100 g of urea per 1000 ml of water, subjected to dry heat of 140° for 15 seconds and then soaped at the boil for 10 minutes, a strongly coloured, brilliant reddish blue dyeing is obtained which is very wet and light fast.

Components are given in columns II, III, IV and VI of Table IV which are used to form formazane dyestuffs according to Example 3 which are converted according to Example 4 with the acylating agents given in column V into reactive dyestuffs. Column VII gives the shade of the dyeings of the reactive dyestuffs on cellulose.

Table IV

| No. | hydrazine component | formyl component | diazo component | acylating agent | complex-forming metal | shade on cellulose fibres |
|---|---|---|---|---|---|---|
| 1 | CH₃CONH—⟨⟩—NH—NH₂, COOH | ⟨⟩—OCH, SO₃H | HO₃S—⟨⟩—NH₂, OH, SO₃H | 2,6-dichloropyrimidine (Cl-N=N-Cl) | Cu | reddish blue |
| 2 | " | " | " | tetrachloropyrimidine | " | " |
| 3 | " | " | HO₃S—⟨⟩—NH₂, OH, SO₂CH₃ | 2,6-dichloropyrimidine-carbonyl chloride | " | " |
| 4 | " | " | " | tetrachloropyrimidine | " | " |
| 5 | " | " | " | 2,6-dichloropyrimidine-carbonyl chloride | " | " |
| 5a | " | ⟨⟩—OCH, SO₃H | " | " | " | " |
| 5b | CH₃—CO—NH—⟨⟩—NH—NH₂, COOH | " | HO₃S—⟨⟩—NH₂, OH, SO₃H | 2,4,6-trichloro-1,3,5-triazine | " | " |

Table IV-continued

| No. | hydrazine from hydrazine component | formyl component | diazo component | acylating agent | complex-forming metal | shade on cellulose fibres |
|---|---|---|---|---|---|---|
| 6 | CH₃CONH—⬡(COOH)—NH—NH₂ | ⬡(OCH)(SO₃H)(SO₃H) | ⬡(OH)(NH₂)(SO₂NH—CH₃) | 2,4,6-trichloro-1,3,5-triazine | " | " |
| 7 | " | " | ⬡(OH)(NH₂)(SO₂CH₃) | 2,4-dichloro-6-methoxy-1,3,5-triazine | " | " |
| 8 | " | " | ⬡(OH)(HO₃S)(NH₂)(SO₂CH₃) | 1,4-dichloro-phthalazine-6-carbonyl chloride | " | " |
| 9 | CH₃OCONH—⬡(COOH)—NH—NH₂ | ⬡(OCH)(SO₃H) | ⬡(OH)(HO₃S)(NH₂)(SO₃H) | 2,4-dichloropyrimidine-5-carbonyl chloride | " | greenish blue |
| 10 | " | " | " | 2,4,5,6-tetrachloropyrimidine | " | " |
| 11 | " | " | ⬡(OH)(HO₃S)(NH₂)(SO₂CH₃) | 2,4-dichloropyrimidine-5-carbonyl chloride | " | " |
| 12 | " | " | ⬡(OH)(HO₃S)(NH₂)(C₃H₇) | 2,4,5,6-tetrachloropyrimidine | " | greenish blue |
| 13 | CH₃CONH—⬡(COOH)—NH—NH₂ | " | " | 2,6-dichloropyrimidine-4-carbonyl chloride | " | " |
| 14 | " | ⬡(OCH)(Cl)(HO₃S) | ⬡(OH)(NH₂)(SO₃H) | 2,4,6-trichloropyrimidine | " | " |
| 15 | " | " | " | Cl—COCH=C(Cl)—CH₃ | " | " |
| 16 | " | ⬡(OCH)(SO₃H)(CH₃) | ⬡(OH)(NH₂)(SO₂CH₃) | 2,6-dichloro-4-amino-1,3,5-triazine | " | " |
| 17 | " | " | ⬡(OH)(NH₂)(O₂S)(H₂C—O) | 2,6-dichloro-4-(cyclohexyl-SO₃H-amino)pyrimidine | " | " |

Table IV-continued

| No. | hydrazine from | | | acylating agent | complex-forming metal | shade on cellulose fibres |
|---|---|---|---|---|---|---|
| | hydrazine component | formyl component | diazo component | | | |
| 18 | " | " | (structure: cyclohexane with OH, HO₃S, NH₂, SO₃H) | (structure: triazine with Cl, Cl, NH-cyclohexane-SO₃H, SO₃H) | " | " |
| 19 | " | (structure: cyclohexane with OCH, SO₃H, C₂H₅) | " | (structure: quinoxaline derivative with Cl, Cl, Cl—OC) | " | " |
| 20 | " | " | " | (structure: phthalazine derivative with Cl, Cl, Cl—OC) | " | " |
| 21 | " | (structure: cyclohexane with OCH, SO₃H) | (structure: cyclohexane with COOH, NH₂, HO₃S) | (structure: triazine with Cl, Cl, NH-cyclohexane-N=N-decalin-SO₃H, SO₃H) | " | green |
| 22 | " | " | (structure: cyclohexane with CH₃, SO₂, NH, HO₃S, NH₂, SO₃H) | (structure: pyrimidine with Cl, Cl, CO-NH-cyclohexane-CH₃-N=N-decalin-SO₃H, SO₃H) | " | " |
| 23 | " | (structure: cyclohexane with OCH, SO₃H) | (structure: cyclohexane with OH, HO₃S, NH₂, SO₃H) | (structure: complex with triazine Cl, Cl, NH-cyclohexane-N, C=C, COOH, OH, N=N-cyclohexane-SO₃H) | " | " |
| 24 | " | " | " | (structure: pyrimidine with Cl, Cl, CO-NH-cyclohexane-N, N=C-CH₃, C=C, OH, N=N-cyclohexane-SO₃H) | " | " |
| 25 | " | (structure: cyclohexane with OCH, SO₃H) | " | (structure: benzothiazole-like with SO₃H, S, CO—Cl) | " | blue |

Table IV-continued

| No. | hydrazine from hydrazine component | formyl component | diazo component | acylating agent | complex-forming metal | shade on cellulose fibres |
|---|---|---|---|---|---|---|
| 26 | " | 2-OCH, 1,3-di-SO₃H cyclohexane | " | bicyclic acyl chloride with N=C-Cl and CO-Cl | " | " |
| 27 | " | 1-OCH, 4-SO₃H cyclohexane | 2-OH, 3-HO₃S, 5-NH₂, 6-CH₃ cyclohexane | Cl-OC cyclohexane with F, NO₂ | " | " |
| 28 | " | 1-OCH, 2-SO₃H cyclohexane | 2-OH, 3-HO₃S, 5-NH₂, 4-SO₃H cyclohexane | Cl-OC cyclohexane with SO₂CH₃, F | " | " |
| 29 | " | OCH-cyclohexane (H) | " | 2,4-dichloropyrimidine-5-CO-Cl | " | " |
| 30 | " | 2-OCH furan | " | 2,4,5,6-tetrachloropyrimidine | " | grey |
| 31 | " | 4-OCH pyridine | 2-OH, 3-HO₃S, 5-NH₂, 4-SO₂CH₃ cyclohexane | 2-Br, 4-Br pyrimidine-5-CO-Br | " | blue |
| 32 | " | 2-OCH thiophene | 2-OH, 3-HO₃S, 5-NH₂, 4-SO₃H cyclohexane | 2,4,5,6-tetrachloropyrimidine | " | green-blue |
| 33 | " | 4-OCH quinoline | " | 2,6-dichloropyrimidine-4-CO-Cl | " | " |
| 34 | " | OCH-CH₂-CH₂-CN | 2-OH, 3-NC, 5-NH₂, SO₃H cyclohexane | cyclohexyl-HN-triazine with 2Cl and SO₃H-cyclohexyl | " | blue |
| 35 | " | OCH-(CH₂)₆-CH₃ | 2-OH, 3-HO₃S, 5-NH₂, 4-SO₃H cyclohexane | 2-Cl, 4-OCH₃ triazine with Cl | " | " |
| 36 | " | OCH-CH₂-OC₂H₅ | " | dibromo bicyclic with BrOC | " | " |

Table IV-continued

| No. | hydrazine from hydrazine component | hydrazine from formyl component | diazo component | acylating agent | complex-forming metal | shade on cellulose fibres |
|---|---|---|---|---|---|---|
| 37 | " | 2-methoxy-benzimidazole (OCH₃ on imidazole) | " | 2-chloro-4-chloro-5-COCl pyrimidine | " | " |
| 38 | " | OCH(CH₃)₂ (isopropoxy) | " | 2-fluoro-4,6-bis(N,N-dimethylamino)-triazine with COCl | " | " |
| 39 | " | cyclohexane with OCH, SO₃H, SO₃H | cyclohexane with OH, NH₂, SO₃H | 2-chloro-4-chloro-5-COCl pyrimidine | " | " |

Similar reactive dyestuffs are also obtained by repeating the examples 7, 16, 17, 18, 21 and 23 of Table IV, supra, and reacting each of these dyestuffs, respectively, with an equivalent amount of
 a. triethylamine
 b. N,N-dimethylhydrazine,
 c. diaza-bicyclooctane,
 d. pyridine to form dyestuffs having the reactive groupings falling under the formula

[triazine structure with $R_8$ and $R_9$ substituents]

in which $R_8$ and $R_9$ represent the groupings shown in the table below:

| Ex. | $R_8$ | $R_9$ |
|---|---|---|
| 7a | $OCH_3$ | $-\overset{+}{N}(CH_3)_3]\ Cl^-$ |
| 7b | " | $-\overset{+}{N}(CH_3)_2-NH_2]Cl^-$ |
| 7c | " | $-\overset{+}{N}\underset{}{\diagup}N\diagdown]\ Cl^-$ (piperazinium) |
| 7d | " | $-\overset{+}{N}\diagdown]\ Cl^-$ (pyridinium) |
| 16a | $NH_2$ | $-\overset{+}{N}(CH_3)_3]\ Cl^-$ |
| 16b | " | $-\overset{+}{N}(CH_3)_2-NH_2]Cl^-$ |
| 16c | " | piperazinium $Cl^-$ |
| 16d | " | pyridinium $Cl^-$ |
| 17a | $-NH-$cyclohexyl-$SO_3H$ | $-\overset{+}{N}(CH_3)_3]\ Cl^-$ |
| 17b | " | $-\overset{+}{N}(CH_3)_2-NH_2]Cl^-$ |
| 17c | " | piperazinium $Cl^-$ |
| 17d | " | pyridinium $Cl^-$ |
| 18a | $-NH-$cyclohexyl(SO₃H)$_2$ | $-\overset{+}{N}(CH_3)_3]\ Cl^-$ |
| 18b | " | $-\overset{+}{N}(CH_3)_2-NH_2]Cl^-$ |
| 18c | " | piperazinium $Cl^-$ |
| 18d | " | pyridinium $Cl^-$ |

-continued

| Ex. | $R_8$ | $R_9$ |
|---|---|---|
| 21a | -NH-[cyclohexyl-N=N-decalin(HO₃S)(SO₃H)]- | $-\overset{+}{N}(CH_3)_3 \; Cl^-$ |
| 21b | " | $-\overset{+}{N}(CH_3)_2-NH_2]Cl^-$ |
| 21c | " | $[-\overset{+}{N} \diagup N \diagdown ] \; Cl^-$ |
| 21d | " | $[-\overset{+}{N} \diagup \diagdown ] \; Cl^-$ |
| 23a | -NH-cyclohexyl-N-N=C-COOH / C=C-N-cyclohexyl-SO₃H / HO | $-\overset{+}{N}(CH_3)_3 \; Cl^-$ |
| 23b | " | $-\overset{+}{N}(CH_3)_2-NH_2]Cl^-$ |
| 23c | " | $[-\overset{+}{N} \diagup N \diagdown ] \; Cl^-$ |
| 23d | " | $[-\overset{+}{N} \diagup \diagdown ] \; Cl^-$ |

EXAMPLE 5

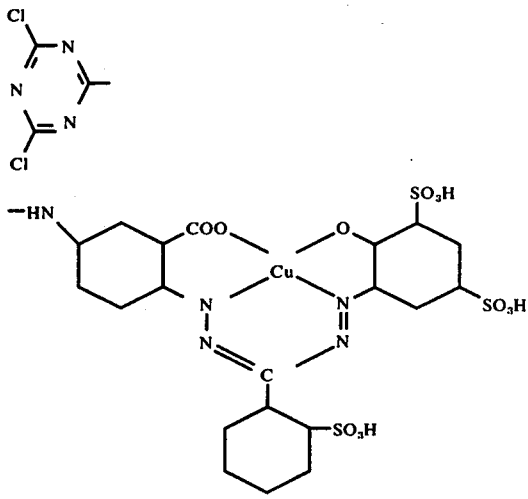

36.5 g of the aryl hydrazone, obtained by condensation of 5-nitro-2-hydrazinobenzoic acid with benzaldehyde-2-sulphonic acid, are slurried in 500 ml of 20°–25° cool water and dissolved with aqueous sodium hydroxide solution at pH 8.0–8.5. First 40 g of sodium carbonate, then the aqueous diazonium suspension, obtained by diazotisation of 18.9 g of 2-hydroxy-1-aminobenzene-3,5-disulphonic acid, and finally 100 ml of a 1 m copper sulphate solution are added to the solution within 1 hour. After stirring for 2 hours at 20°–25°, the reaction mixture is heated to 40°–45°, the pH of the solution is adjusted to 9.0 – 9.5 with concentrated aqueous sodium hydroxide solution, 19.5 g of anhydrous sodium sulphide are added and the whole is stirred for 2 hours, i.e. until the reduction is complete, at 40°–45°. Then 100 ml of 1 molar copper sulphate solution are added dropwise to re-form the complex dyestuff which has been de-metallised during the reduction, and the mixture is stirred for 18 hours at 40°–45°. 10 g of animal charcoal are then added to the reaction mixture which is clarified by filtration. The amino formazane dyestuff formed is precipitated by the addition of sodium chloride, filtered off, washed with aqueous sodium chloride solution and the filter residue is dissolved, with a neutral reaction, in 500 ml of 20°–25° cool water.

This solution is added dropwise within 2 hours at 0°–5° to an aqueous dispersion of 22.2 g of cyanuric chloride, obtained by adding a solution of 22.2 g of cyanuric chloride in 150 ml of acetone dropwise to a mixture of ice and water. During the dropwise addition of the dyestuff solution the pH of the reaction mixture is kept at 2.5 – 3.0 by the addition of sodium acetate. As soon as no more free amino groups can be traced, the reactive dyestuff obtained of the above formula is precipitated with sodium chloride, filtered off, washed with dilute sodium chloride solution and dried in vacuo at 40–45°.

It is a dark powder which dissolves in water with a blue colour.

If cotton is pad dyed with a solution which contains 20 g of the above dyestuff, 20 g of sodium carbonate and 50 g of sodium chloride per 1000 ml of water, rolled up, stored for 4 hours and then soaped at the boil for 10 minutes, then a deep, pure, reddish blue dyeing is obtained which, after soaping, has very good fastness to wet and light.

Reactive dyestuffs of similar good dyeing properties on wool and cotton are obtained by repeating Example 5 but using in lieu of the 22.2 g of cyanuric chloride used therein an equivalent amount of each of the following reactants: a condensation product of cyanuric chloride and m-amino-benzene sulfonic acid (molar ratio 1:1 );

acryloyl chloride, chloroacetyl chloride, bromoacetyl chloride, methacryloyl chloride, α-chloro-acryloyl chloride, β-chloro-acryloyl chloride, β-bromo-acryloyl chloride, α,β, -dichloro-acryloyl chloride, α,β, -dibromo-acryloyl chloride, 2,4-dichloro-pyrimidine-5-carboxylic acid chloride, 2,4-dichloro-6-methylamino-s-triazine, 2,4-dichloro-6-methoxy-s-triazine, 2,4,6-tri-bromo-s-triazine, 2,4,6-trifluoro-s-triazine, 2,4,6-tribromo-pyrimidine, 2,4,5,6-tetrabromo-pyrimidine, 2,4,5,6-tetrachloro-pyrimidine, 2,4-dibromo-pyrimidine-6-carboxylic acid bromide, 2,4,6-trichloro-pyrimidine.

Similar reactive dyestuffs are also obtained by repeating Example 5, but using first in lieu of the aforesaid cyanuric chloride an equivalent amount of:
2,3-dichloro-quinoxaline-6-carboxylic acid chloride,
2,3-dichloro-quinoxaline-6-sulphonyl chloride,
1,4-dichloro-phthalazine-6-carboxylic acid chloride,
2,4-dichloro-quinazoline-6-carboxylic acid chloride,
2,4-dichloro-quinazoline-7-carboxylic acid chloride,
[4′, 5′-dichloro-6′-pyridazonyl-(1′)]-acetal chloride,
[4′, 5′-dichloro-6′-pyridazonyl-(1′)]-benzoyl chloride.

Similar reactive dyestuffs are also obtained by repeating Example 5, but using first in lieu of the aforesaid cyanuric chloride and equivalent amount of 2,4-dichloro-6-dimethylamino-s-triazine and then reacting the resulting dyestuff with an equivalent amount of (a) trimethylamine, or (b) N,N-dimethyl-hydrazine, or (c) diaza-bi-cyclooctane, or (d) pyridine to form the dyestuffs having the reactive groupings

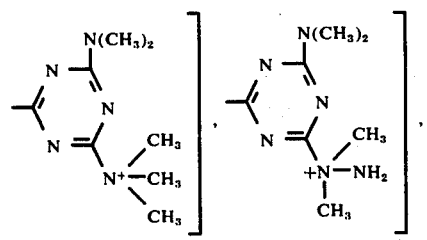

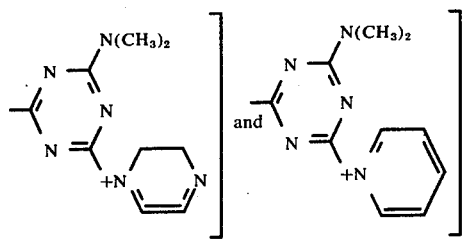

respectively, or first using 2,4-dibromo-pyrimidine-6-carboxylic acid bromide, or 2,4-dichloro-pyrimidine-5-carboxylic acid chloride and then reacting the resulting dyestuff first with ammonia, methylamine, diethylamine, 3-sulphophenylamine or methanol and then with the above-employed quaternizing agents (a) through (d), thereby obtaining the correspondingly substituted derivatives having the quaternary nitrogen, in the case of the s-triazinyl, the pyrimidine-5-carbonyl radicals and the pyrimidine-6-carbonyl radical, in 2-position and the amino-, methylamino-, diethylamino, 3-sulphophenylamino or methoxy-group in 4-position at the pyrimidine nucleus.

Dyestuffs having similar properties are obtained if, instead of the components used in this Example, equivalent amounts of the components given in columns II, III, IV, V, and VI of the following Table V are used and otherwise the procedure given in the Example is followed. The shades of the dyeings obtained on cellulose or polyamide with the corresponding formazane dyestuffs are given in the last column of the Table.

Table V

| No. | hydrazone from | | diazo component | acylating agent | complex-forming metal | shade on cellulose or polyamide fibres |
|---|---|---|---|---|---|---|
| | hydrazine component | formyl component | | | | |
| 1 | O₂N—⌬(COOH)—NH—NH₂ | OCH—⌬—SO₃H | HO₃S—⌬(OH)(SO₃H)—NH₂ | Cl-pyrimidine (Cl,Cl) | Cu | reddish blue |
| 2 | " | OCH—⌬(SO₃H)—SO₃H | ⌬(OH)(SO₂CH₃)—NH₂ | Cl-pyrimidine (Cl,COCl) | Ni | violet |
| 3 | " | OCH—⌬—SO₃H | HO₃S—⌬(OH)(SO₃H)—NH₂ | Cl—CO—C(Cl)=CH₂ | Cu | greenish blue |
| 4 | " | OCH—⌬(HO₃S)—ClHO₃S | ⌬(OH)(SO₂NH₂)—NH₂ | Cl-triazine-NH-⌬-SO₃H, Cl | Cu | greenish blue |

Table V-continued

| No. | hydrazone from hydrazine component | hydrazone from formyl component | diazo component | acylating agent | complex-forming metal | shade on cellulose or polyamide fibres |
|---|---|---|---|---|---|---|
| 5 | '' | 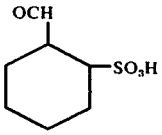 OCH, SO$_3$H | 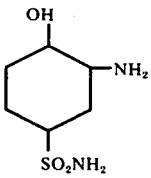 OH, NH$_2$, SO$_2$NH$_2$ | Cl—CH$_2$—CO—Cl | Cu | reddish blue on polyamide |
| 6 | '' | '' | '' | CH$_2$Br—CHBr—CO—Cl | Cu | '' |
| 7 | '' | 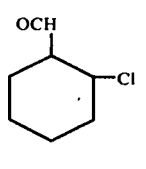 OCH, Cl |  OH, HO$_3$S, NH$_2$, SO$_2$CH$_3$ | CH$_2$Cl—CHCl—CO—Cl | Cu | blue on polyamide |
| 8 | '' | '' | '' | CH$_2$=C—CO—Cl \| Br | Cu | '' |
| 9 | '' | 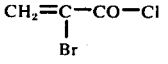 OCH, Cl, Cl | 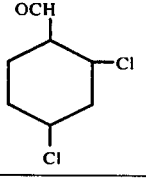 OH, NH$_2$, SO$_2$CH$_3$ | CH$_2$Br—CHBr—CO—Cl | Co | green on polyamide |

EXAMPLE 6

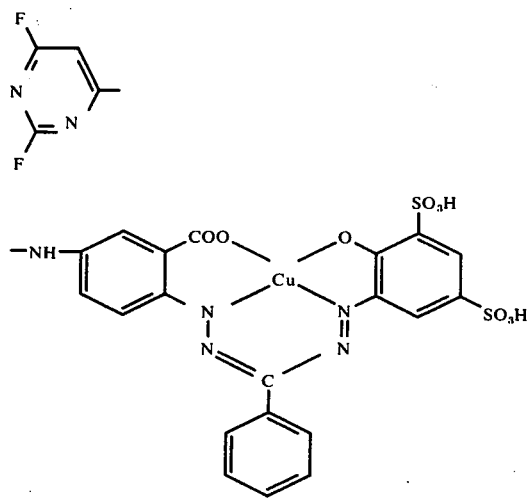

33.5 g of 2-amino-5-(2', 6'-difluoro-pyrimidyl-amino-4'-)-benzoic acid are dissolved neutral in 300 ml of water and diazotized with 6.9 g of sodium nitrite and 40 ml of 10-n. hydrochloric acid at 0°–10° with addition of ice. The diazonium suspension then is added drop by drop to a suspension of 20.4 g of phenylformylacetic-acid-ethyl ester in 200 ml of water, 250 ml of dioxane and 10.5 ml of 10-n. sodium hydroxide solution at 0°–10°. During addition of the diazonium compound, the reaction mixture is always maintained in phenolphthalein-alkaline condition by interspersing sodium carbonate. After completed coupling, the coupling mixture is heated to 30°–35°, admixed with 10.5 ml of 10-n. sodium hydroxide solution within 30 minutes, and stirred for 3 hours at 30°–35°, whereupon the ester group is saponified completely. The solution of the saponification product formed is then treated with acetic acid to set it to a condition acid to litmus, admixed with 15 g of sodium acetate and 100 ml of 1-m-copper sulfate solution, and thereafter the diazonium suspension, obtained by diazotation of 26.9 g of 2-hydroxy-1-aminobenzene-3,5-disulfonic acid with 30 ml of hydrochloric acid and 6.9 g of sodium nitrite, is added in portions at 0°–5°. There forms the copper complex of the foregoing formula, which is precipitated by addition of sodium chloride, filtered off, washed with dilute sodium chloride solution, and dried at 80° in a vacuum.

The product is a dark powder which dissolves in water with blue colour. It dyes natural and synthetic polyamide fibres from acetic-acid bath in pure greenish-blue colour tones which exhibit high fastness to light and wetting.

EXAMPLE 7

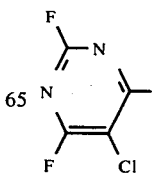

-continued

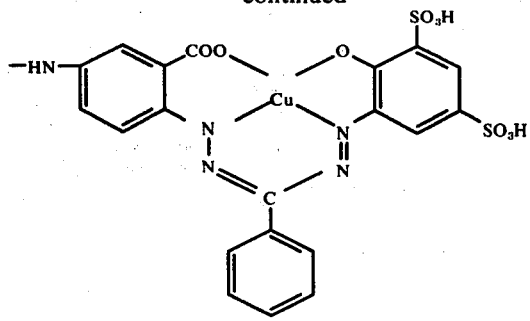

63.8 g of the dye, obtained from 2-amino-5-acetyl-aminobenzoic acid, phenylformylacetic-acid-ethyl ester, copper sulfate and 2-hydroxy-1-aminobenzene-3,5-disulfonic acid in a manner analogous to the preparation method as per example 6, are dissolved neutral in 1000 ml of water at 90°–95°, admixed with 50 g of sodium hydroxide and 100 ml of dioxane, and stirred at 95°–98° for 5 hours. The copper complex of the aminoformazane dye formed is precipitated from the hot solution by addition of common salt, cooled to 20°–25° with stirring, filtered off, and the suction-filtered material is redissolved in 800 ml of water at 40°–45°. At this temperature, 17.0 g of 2,4,6-trifluoro-5-chloropyrimidine are thereafter added drop by drop within one hour, with always maintaining the pH value of the reaction mixture at 6.0–6.5 by simultaneously adding sodium carbonate. As soon as no free amino groups are any more detectable, the formed reactive dye of the foregoing formula is precipitated with sodium chloride, filtered off, washed with common salt solution, and dried at 60°–65° in a vacuum.

The product is a dark powder which dissolves in water with blue colour.

It dyes natural or regenerated cellulose fibres from dilute liquor, in the presence of an acid-binding agent, in pure greenish-blue tones which after treatment with boiling soap solution exhibit high fastness to light and wetting.

Dyes exhibiting similar properties are obtained if the formazane dyes obtained according to the method of example 6 with using equivalent amounts of the components set forth in columns II, III, IV and V of the following Table IV are saponified as indicated in example 7, and thereafter reacted with equivalent amounts of the pyrimidine compounds set forth in column VI. In column VII of the same Table, the colour tones of dyeings obtained with the respective fibre-reactive formazan complexes on cellulose are indicated.

Table VI

| I | II | III | IV | V | VI | VII |
|---|---|---|---|---|---|---|
| No. | 1st Diazo component | Coupling component | 2nd Diazo component | Complex forming metal | Pyrimidine compounds | Colour tone on cellulose fibres |
| 1 | CH₃CONH–C₆H₃(COCH)–NH₂ | OHC–CH(COOC₂H₅)–C₆H₅ | HO₃S–C₆H₃(OH)(NH₂)–SO₂CH₃ | Cu | 2,4,6-trifluoro-5-chloropyrimidine | greenish-blue |
| 2 | " | " | HO₃S–C₆H₃(OH)(NH₂)–SO₂C₂H₅ | Cu | 2,4,6-trifluoropyrimidine | " |
| 3 | " | " | HO₃S–C₆H₃(OH)(NH₂)–SO₂N(C₂H₅)₂ | Cu | " | " |
| 4 | " | OHC–CH(COOC₂H₅)–C₆H₄Cl | HO₃S–C₆H₃(OH)(NH₂)–SO₃H | Cu | 2,4,6-trifluoro-5-chloropyrimidine | " |

Table VI-continued

| No. | 1st Diazo component | Coupling component | 2nd Diazo component | Complex forming metal | Pyrimidine compounds | Colour tone on cellulose fibres |
|---|---|---|---|---|---|---|
| 5 | CH$_3$OCONH—, COOH, NH$_2$ (benzene) | " | OH, Cl, NH$_2$, SO$_3$H (benzene) | Cu | " | " |
| 6 | " | OHC–CH–COOC$_2$H$_5$, 2,4-dichlorophenyl | OH, HO$_3$S, NH$_2$, SO$_3$H (benzene) | Cu | " | " |
| 7 | CH$_3$OCON(CH$_3$)—, NH$_2$, COOH (benzene) | OHC–CH–COOC$_2$H$_5$, phenyl | OH, NH$_2$, SO$_2$NH$_2$ (benzene) | Ni | " | violet |
| 8 | CH$_3$CONH—, COOH, NH$_2$ (benzene) | " | OH, HO$_3$S, NH$_2$, SO$_3$H (benzene) | Cu | 2,4,6-trifluoropyrimidine (F, N, N, F, F) | greenish-blue |
| 9 | CH$_3$CONH—, COOH, NH$_2$ (benzene) | OHC–CH–COOC$_2$H$_5$, naphthyl | OH, O$_2$N, NH$_2$, SO$_3$H (benzene) | Cu | 2,4,6-trifluoropyrimidine | greenish-blue |
| 10 | CH$_3$CONH—, NH$_2$, COOH (benzene) | OHC–CH–COOC$_2$H$_5$, phenyl | OH, HO$_3$S, NH$_2$, CH$_3$ (benzene) | Cu | " | blue |
| 11 | " | " | OH, HO$_3$S, NH$_2$, SO$_2$CH$_2$CH$_3$ (benzene) | Cu | " | blue |
| 12 | " | OHC–CH–COOC$_2$H$_5$, 4-chlorophenyl | OH, HO$_3$S, NH$_2$, SO$_3$H (benzene) | Cu | " | blue |

Table VI-continued

| No. | I 1st Diazo component | III Coupling component | IV 2nd Diazo component | V Complex forming metal | VI Pyrimidine compounds | VII Colour tone on cellulose fibres |
|---|---|---|---|---|---|---|
| 13 | '' | OHC-CH-COOC₂H₅ with 4-chlorophenyl | 4-amino-3-hydroxy-1-naphthalenesulfonic acid | Cu | '' | green |
| 14 | '' | OHC-CH-COOC₂H₅ with phenyl | 4-amino-3-hydroxy-6-sulfo-1-naphthalenesulfonic acid | Cu | '' | '' |
| 15 | CH₃CONH—C₆H₃(NH₂)(COOH) | OHC-CH(CH₂-phenyl)-COOC₂H₅ | 4-amino-3-hydroxy-6-sulfo-1-naphthalenesulfonic acid | Cu | 2,5-difluoro-4-chloro-pyrimidine | blue |
| 16 | '' | CNCH₂COOC₂H₅ | '' | Cu | '' | violet |
| 17 | '' | CH₂(CO—O—C₂H₅)₂ | '' | Cu | '' | violet |
| 18 | '' | CN—CH₂—CO—NH₂ | 2-amino-phenol-4-sulfonic acid | Cu | '' | violet |
| 19 | '' | OHC-CH(phenyl)-COOC₂H₅ | '' | Cu | '' | blue |
| 20 | '' | OHC-CH(CH₂-phenyl)-COOC₂H₅ | '' | Cu | '' | blue |
| 21 | '' | '' | 2-hydroxy-3-amino-benzenesulfonic acid | Cu | '' | blue |

Table VI-continued

| I No. | II 1st Diazo component | III Coupling component | IV 2nd Diazo component | V Complex forming metal | VI Pyrimidine compounds | VII Colour tone on cellulose fibres |
|---|---|---|---|---|---|---|
| 22 | " | " | HO₃S–[benzene with OH, NH₂, SO₃H] | Cu | " | blue |

EXAMPLE 8

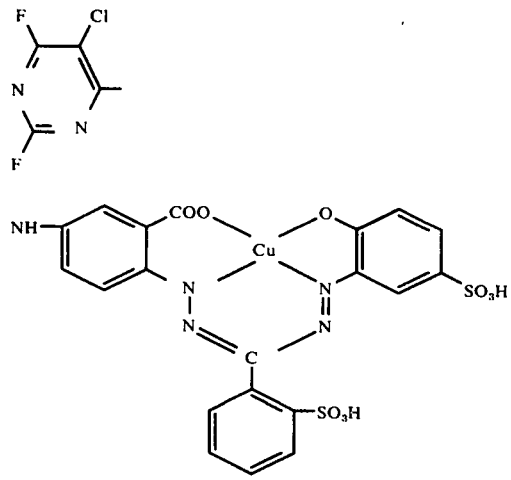

37.8 g of the arylhydrazone, obtained by condensation of 2-hydrazino-5-acetylaminobenzoic acid with benzaldehyde-2-sulfonic acid, are suspended in 500 ml of water at 20°–25°, and dissolved with an aqueous sodium hyroxide solution at a pH value of 8.0–8.5. After addition of 40 g of sodium carbonate, 100 ml of an aqueous 1-m copper sulfate solution and the aqueous diazonium suspension, obtained by diazotation of 18.9 g of 2-hydroxy-1-amino-benzene-5-sulfonic acid, are allowed to flow in simultaneously. As soon as the coupling is completed, the reaction mixture is heated to 90°– °, admixed with 50 g of sodium hydroxide, and stirred out at 95°–98° for 5 hours, whereupon the acetylamino group is saponified completely. The copper complex of the aminoformazane dye formed is precipitated with sodium chloride, filtered off at 20°–25°, washed with dilute sodium chloride solution, and redissolved in 1000 ml of water at 30°–35°. After the solution has cooled down to 10°–15°, 16.9 g of 2,4,6-trifluoro-5-chloropyrimidine are added drop by drop within one hour, and the pH value of the reaction mixture is always maintained at 6.0–6.5 by simultaneously adding dropwise aqueous sodium carbonate. As soon as no free amino group are any more detectable, the obtained reactive dye of the foregoing formula is precipitated with sodium chloride, filtered off, washed with sodium chloride solution and dried at 60°–65° in a vacuum. The product is a dark powder which dissolves in water with blue colour In Table VII, columns II, III, IV and VI include components which are built up and saponified to formazan dyes in accordance with example 8, and converted into reactive dyes with the pyrimidine compounds set forth in column V. In column VII, the colour tone of the dyeings of the reactive dyes on cellulose fibres are indicated.

Table VII

| I No. | II Hydrazone from hydrazine component | III formyl component | IV Diazo component | V Pyrimidine compounds | VI Complex forming metal | VII Colour tone on cellulose fibres |
|---|---|---|---|---|---|---|
| 1 | CH₃CONH–[benzene]–COOH, –NH–NH₂ | OCH–[benzene]–SO₃H | HO₃S–[benzene with OH, NH₂, SO₃H] | [pyrimidine with F, F, Cl, N, N] | Cu | reddish-blue |

Table VII-continued
| I No. | II Hydrazone from hydrazine component | III formyl component | IV Diazo component | V Pyrimidine compounds | VI Complex forming metal | VII Colour tone on cellulose fibres |
|---|---|---|---|---|---|---|
| 2 | " | " | " | 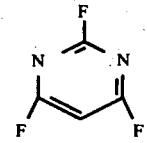 | Cu | " |
| 3 | " | 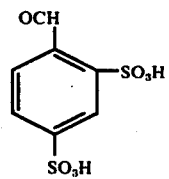 | 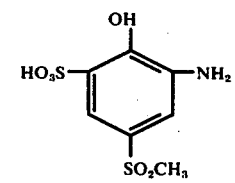 | " | Cu | " |
| 4 | " | " | " | 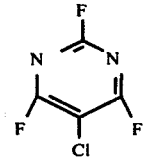 | Cu | " |
| 5 | " | " | " | 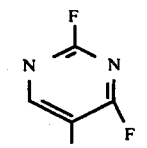 | Cu | " |
| 6 | " | " | 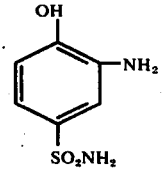 | 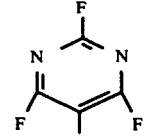 | Cu | " |
| 7 | " | " |  | " | Cu | " |
| 8 | 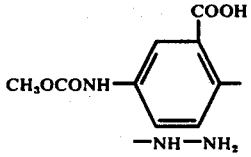 | 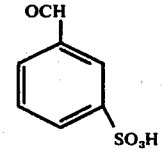 | 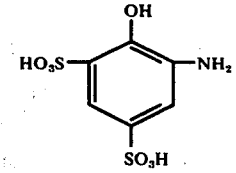 | " | Cu | greenish-blue |
| 9 | " | " | " | 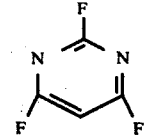 | Cu | " |
| 10 | " | " | 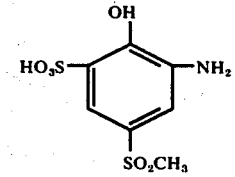 | 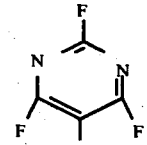 | Cu | " |

Table VII-continued

| I No. | II Hydrazone from hydrazine component | III Hydrazone from formyl component | IV Diazo component | V Pyrimidine compounds | VI Complex forming metal | VII Colour tone on cellulose fibres |
|---|---|---|---|---|---|---|
| 11 | COOH, CH₃OCON(CH₃)- substituted benzene with —NH—NH₂ and CH₃ | OCH, benzene with SO₃H | HO₃S, OH, NH₂, CH₃ substituted benzene | 2,6-difluoro-5-chloropyrimidine (F, N, N, F, Cl) | Cu | greenish-blue |
| 12 | COOH, CH₃CONH- substituted benzene with —NH—NH₂ and CH₃ | '' | '' | '' | Cu | '' |
| 13 | '' | OCH, Cl, HO₃S substituted benzene | OH, NH₂, SO₃H substituted benzene | '' | Cu | '' |
| 14 | '' | '' | HO₃S, OH, NH₂, SO₃H substituted benzene | '' | Cu | '' |
| 15 | '' | OCH, SO₃H, CH₃ substituted benzene | OH, NH₂, SO₂CH₃ substituted benzene | '' | Cu | '' |
| 16 | '' | '' | OH, NH₂, O₂S—O—CH₂ (cyclic) substituted benzene | '' | Cu | '' |
| 17 | '' | '' | HO₃S, OH, NH₂, SO₃H substituted benzene | '' | Cu | '' |
| 18 | '' | OCH, SO₃H, C₂H₅ substituted benzene | HO₃S, OH, NH₂, SO₃H substituted benzene | '' | Cu | '' |
| 19 | '' | OCH, SO₃H substituted benzene | COOH, NH₂, HO₃S substituted benzene | '' | Cu | green |

Table VII-continued

| I No. | II Hydrazone from hydrazine component | III formyl component | IV Diazo component | V Pyrimidine compounds | VI Complex forming metal | VII Colour tone on cellulose fibres |
|---|---|---|---|---|---|---|
| 20 | '' | '' | [benzene with CH₃-SO₃-NH, HO₃S, NH₂, SO₃H substituents] | '' | Cu | '' |
| 20a | '' | '' | [naphthalene with NH₂, OH, HO₃S, SO₃H substituents] | '' | Cu | blue |
| 21 | '' | [cyclohexane with OCH, H] | [benzene with OH, HO₃S, NH₂, SO₃H] | '' | Cu | '' |
| 22 | '' | [furan with OCH] | '' | '' | Cu | gray |
| 23 | '' | [pyridine with OCH] | [benzene with OH, HO₃S, NH₂, SO₂CH₃] | '' | Cu | blue |
| 24 | '' | [thiophene with OCH] | [benzene with OH, HO₃S, NH₂, SO₃H] | '' | Cu | green-blue |
| 25 | '' | [quinoline with OCH] | '' | '' | Cu | '' |
| 26 | '' | OCH-CH₂-CH₂-CN | [benzene with OH, NC, NH₂, SO₃H] | '' | Cu | blue |
| 27 | '' | OCH-(CH₂)₆-CH₃ | [benzene with OH, HO₃S, NH₂, SO₃H] | '' | Cu | '' |

Table VII-continued

| I No. | II Hydrazine component | III Formyl component | IV Diazo component | V Pyrimidine compounds | VI Complex forming metal | VII Colour tone on cellulose fibres |
|---|---|---|---|---|---|---|
| 28 | " | OCH, CH₂, OC₂H₅ | " | " | Cu | " |
| 29 | " | OCH with benzimidazole | " | " | Cu | " |
| 30 | " | OCH, CH(CH₃)₂ | " | " | Cu | " |
| 31 | COOH, CH₃OCOHN-phenyl-CH₃, -NH-NH₂ | OCH, SO₃H, SO₃H (phenyl) | OH, NH₂, SO₂C₂H₅ (phenyl) | " | Cu | reddish-blue |
| 32 | " | " | OH, NH₂, Cl (phenyl) | " | Cu | " |
| 33 | COOH, CH₃CONH-phenyl-CH₃, -NH-NH₂ | OCH, SO₃H, CH₃ (phenyl) | HO₃S, OH, NH₂, SO₂CH₃ (phenyl) | " | Cu | blue |
| 34 | " | OCH, SO₃H, SO₃H (phenyl) | OH, NH₂, SO₃H (phenyl) | " | Cu | reddish-blue |

EXAMPLE 9

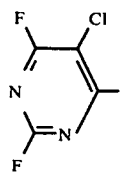

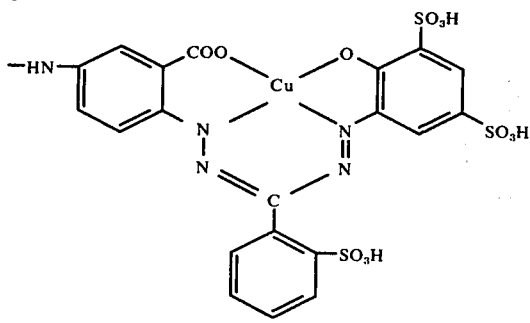

36.5 g of the arylhydrazone, obtained by condensation of 5-nitro-2-hydrazinobenzoic acid with benzaldehyde-2-sulfonic acid, are suspended in 500 ml of water at 20°–25° and dissolved by means of an aqueous sodium hydroxide solution at a pH value of 8.0–8.5. The solution is admixed sequentially with 40 g of sodium carbonate and the aqueous diazonium suspension, obtained by diazotizing 18.9 g of 2-hydroxy-1-aminobenzene-3,5-disulfonic acid, and thereafter 100 ml of a 1-m copper sulfate solution is added drop by drop within one hour. After stirring for 2 hours at 20°–25°, the reaction mixture is heated to 40–45°, the pH value of the solution is set to 9.0–9.5 with concentrated aqueous sodium hydroxide solution, the resulting solution is admixed with 19.5 g of anhydrous sodium sulfide, and stirred for 2 hours, i.e. until completion of the reduction, at 40°–45°. Thereafter 100 ml of 1 m-copper sulfate solution are added drop by drop to re-form the complex dye demetallized during the reduction, and the mixture is stirred for another 18 hours at 40°–45°. The reaction mixture thereafter is admixed with 10 g of animal charcoal, and clarified by filtration. The aminoformazane dye formed is precipitated by adding sodium chloride, filtered off, washed with aqueous sodium chloride solution, and the suction-filtered material is dissolved neutral in 500 ml of water at 20°–25°.

To this solution 16.9 g of 2,4,6-trifluoro-5-chloropyrimidine are added drop by drop within 2 hours at 10°–15°. During the dropwise adding, the pH value of the reaction mixture is maintained at 6.0–6.5 by adding sodium carbonate. As soon as no free amino group are any more detectable, the obtained reactive dye of the foregoing formula is precipitated with sodium chloride, filtered off, washed with dilute sodium chloride solution, and dried at 40°–45° in a vacuum.

The product is a dark powder which dissolves in water with blue colour.

Dyes exhibiting similar properties are obtained by using, in the place of the components employed in this example, equivalent amounts of the components set forth in columns II, III, IV, V and VI of the following Table VIII, and otherwise carrying out the process as described in this example. In column VII of the same Table, the colour tones of dyeings obtained with the respective formazan dyes on cellulose, respectively on polyamide are indicated.

Table VIII

| I | II | III | IV | V | VI | VII |
|---|---|---|---|---|---|---|
| No. | Hydrazone from hydrazine component | Hydrazone from formyl component | Diazo component | Pyrimidine compounds | Complex forming metal | Colour tone on cellulose fibres or polyamide fibres respectively |
| 1 | O₂N—⟨⟩(COOH)—NH—NH₂ | OCH—⟨⟩—SO₃H | HO₃S—⟨⟩(OH)(SO₃H)—NH₂ | F,F,F,Cl-pyrimidine | Cu | reddish-blue |
| 2 | " | OCH—⟨⟩(SO₃H)—SO₃H | ⟨⟩(OH)(SO₂CH₃)—NH₂ | " | Ni | violet |
| 3 | " | OCH—⟨⟩—SO₃H | HO₃S—⟨⟩(OH)(SO₃H)—NH₂ | " | Cu | greenish-blue |
| 4 | " | OCH—⟨⟩(Cl)(HO₃S) | HO₃S—⟨⟩(OH)(SO₂NH₂)—NH₂ | " | Cu | greenish-blue |
| 5 | " | OCH—⟨⟩—SO₃H | ⟨⟩(OH)(SO₂NH₂)—NH₂ | " | Cu | reddish-blue on polamide |
| 6 | " | " | Cl—⟨⟩(OH)(SO₃H)—NH₂ | F,F,F,Cl-pyrimidine | Cu | " |
| 7 | " | OCH—⟨⟩—Cl | HO₃S—⟨⟩(OH)(SO₂CH₃)—NH₂ | " | Cu | blue on polyamide |

Table VIII-continued

| I No. | II Hydrazone from hydrazine component | III Hydrazone from formyl component | IV Diazo component | V Pyrimidine compounds | VI Complex forming metal | VII Colour tone on cellulose fibres or poly amide fibres respectively |
|---|---|---|---|---|---|---|
| 8 | " | " | " | 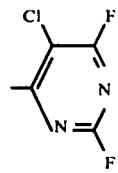 | Cu | " |
| 9 | " | 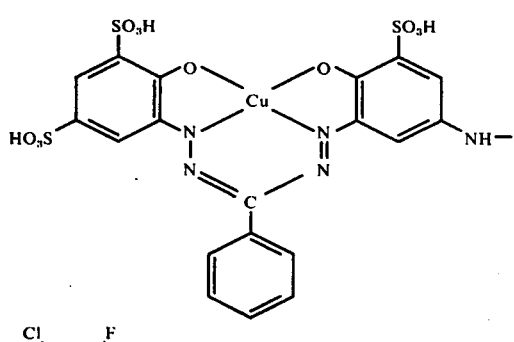 | 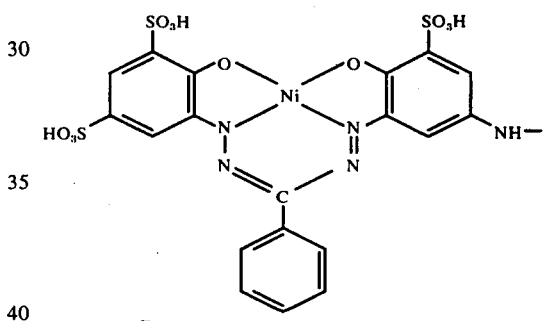 | " | Co | green on polyamide |

EXAMPLE 10

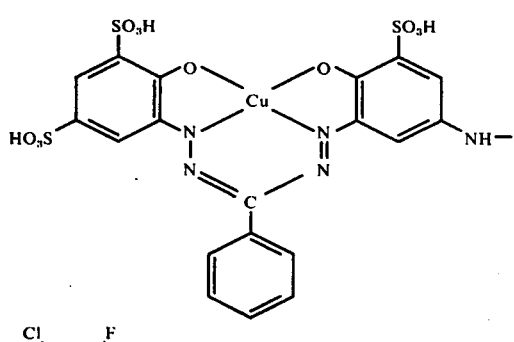

64,8 g of the copper complex compound of N-(-2-hydroxy-5-aminophenyl 3-sulphonic-acid)-N'-(2'-hydroxyphenyl-3', 5'-disulphonic-acid)-ms-phenylformazan (obtained by coupling equimolecular amounts of diazotized 2-amino-1-hydroxybenzene-4,6-disulphonic acid and 4-acetylamino-2-amino-1-hydroxybenzene-6-sulphonic acid in the presence of copper salts with phenylformylacetic-acid-ethyl ester in manner known per se and thereafter saponifying the acetylamino group with dilute caustic soda solution) are dissolved in 1200 ml of water at a pH value of 6.0–6.5. To this solution, 16.9 g of 2,4,6-trifluoro-5-chloropyrimidine in 100 g of acetone are added drop by drop within one hour at 10°–15° simultaneously with an aqueous solution of sodium carbonate in manner so that the pH value of the reaction mixture is always maintained at 6.0–6.5. As soon as the condensation is completed, the dye of the above-stated formula is precipitated by adding sodium chloride, filtered off, washed with dilute sodium chloride solution, and carefully dried in a vacuum. The product is a dark powder which dissolves in water with blue colour.

EXAMPLE 11

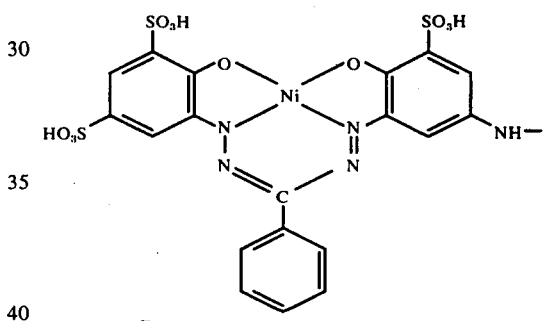

64,3 g of the nickel complex compound of N-(2-hydroxy-5-aminophenyl-3-sulphonic-acid)N'-(2'-hydroxyphenyl-3', 5'-disulphonic-acid)-ms-phenyl-formazon (obtained by coupling equimolecular amounts of diazotized 2-amino-1-hydroxybenzene-4,6-disulphonic acid and 4-acetylamino-2-amino-1-hydroxybenzene-6-sulphonic acid in the presence of nickel salts with phenylformylacetic-acid-ethyl ester in manner known per se and thereafter saponifying the acetylamino group with dilute caustic soda solution) are dissolved neutral in 1200 ml of water. To this solution, 13.4 g of 2,4,6-trifluoropyrimidine in 100 g of acetone are added drop by drop within one hour at 20°–25° simultaneously with an aqueous sodium carbonate solution in manner so that the reaction mixture remains always neutral. As soon as no free amine is any more detectable, the dye is precipitated by adding sodium chloride, filtered off and washed with dilute sodium chloride solution. The dye of the above constitution, after drying in a vacuum, represents a dark powder wich dissolves in water with violet colour.

EXAMPLE 12

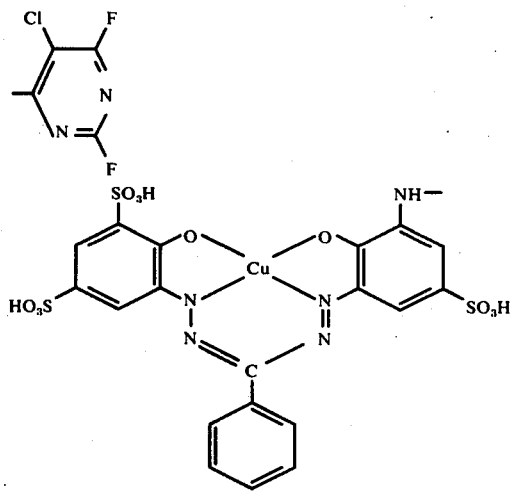

64,8 g of the copper complex compound of N-(2-hydroxy-3-aminophenyl-5-sulphonic-acid)-N'-(2'-hydroxyphenyl-3', 5'-disulphonic-acid)-ms-phenylformazan (obtained by coupling equimolecular amounts of diazotized 2-amino-1-hydroxybenzene-4,6-disulphonic acid and 6-acetylamino-2amino-1-hydroxybenzene-4-sulphonic acid in the presence of copper salts in manner known per se with phenylformylacetic-acid-ethyl ester and thereafter saponifying the acetylamino group with dilute caustic soda solution) ae dissolved in 1200 g of water at a pH value of 6.0–6.5. To this solution, 16.9 g of 2,4,6-trifluoro-5-chloropyrimidine together with an aqueous sodium carbonate solution are added drop by drop within one hour at 15°–20° in manner so that the reaction remains always neutral. After completion of the condensation, the reaction product is precipitated by adding sodium chloride. The dye is filtered off, washed with dilute sodium chloride solution and dried at 40°–45° in a vacuum. After drying, the dye of the above constitution represents a dark powder which dissolves in water with blue colour.

EXAMPLE 13

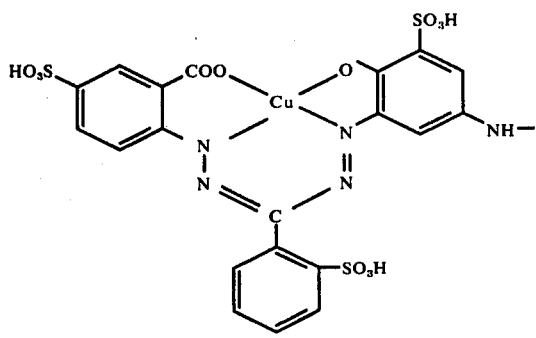

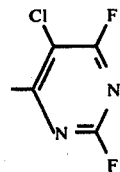

67.6 g of the copper complex compound of N-(2-hydroxy-5-aminophenyl-3-sulphonic-acid)-N'-(2'-carboxyphenyl-4'-sulphonic-acid)-xs-o-sulphonic-acid-phenylformazan (obtained by coupling diazotized 4-acetylamino-2-amino-1-hydroxybenzene-6-sulphonic acid with the hydrazone from benzaldehyde-2-sulphonic acid and phenylhydrazine-2-carboxylic-acid-4-sulphonic acid in manner known per se and thereafter coppering and saponifying the acetylamino group with dilute caustic soda solution) are dissolved neutral in 1200 g of water. To this solution, 16.9 g of 2,4,6-trifluoro-5-chloropyrimidine are added drop by drop within 2 hours at a pH value of 6.0–6.5 and at 10°–15°.

As soon as no starting dye is any more detectable, the dye is separated by adding sodium chloride, filtered off, washed with dilute sodium chloride solution and finally dried in a vacuum. The dye of the above constitution dissolves in water with blue colour.

EXAMPLE 14

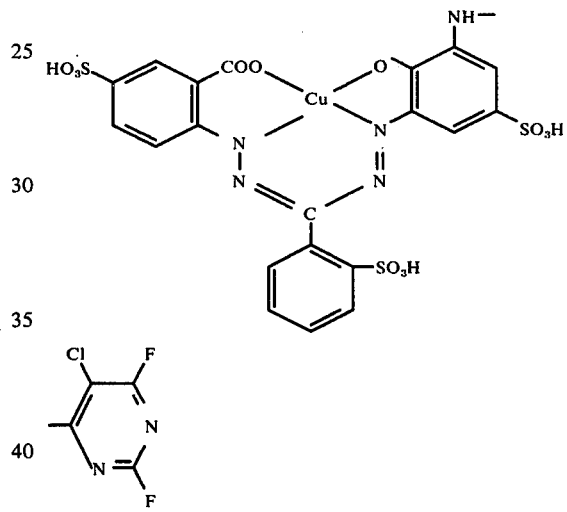

67.6 g of the copper complex compound of N-(2-hydroxy-3-aminophenyl-5-sulphonic-acid)-N'-(2'-carboxyphenyl-4'-sulphonic-acid)-ms-o-sulphophenyl-formazan (obtained by coupling diazotized 6-acetylamino-2-amino-1-hydroxybenzene-4-sulphonic acid with the hydrazone from benzaldehyde-2-sulphonic acid and phenylhydrazine-2-carboxylic-acid-4-sulphonic acid in manner known per se, coppering and saponifying the acetylamino group with dilute caustic soda solution) are dissolved neutral in 1200 ml of water. To this solution, 16.9 g of 2,4,6-trifluoro5-chloropyrimidine are added within 2 hours at 10°–15°, and the pH value of the reaction mixture is maintained at 6.0–6.5 by simultaneously adding dropwise a dilute sodium carbonate solution. The condensation product is separated by adding sodium chloride, filtered off, washed with dilute sodium chloride solution and dried at 60°–65° in a vacuum. The dye of the above constitution is a dark powder which dissolves in water with blue colour.

EXAMPLE 15

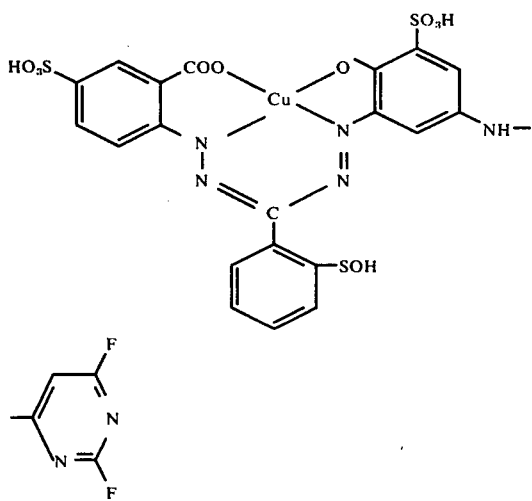

67.6 g of N-(2-hydroxy-5-aminophenyl-3-sulphonic-acid)-N'-(2'-carboxyphenyl-4'-sulphonic-acid)-ms-o-sulphophenylformazan (obtained by coupling the diazonium compound of 4-acetylamino-2-amino-1-hydroxybenzene-6-sulphonic acid with the hydrazone from benzaldehyde-2-sulphonic acid and phenylhydrazine-2-carboxylicacid-4-sulphonic acid and therafter saponifying the acetylamino group with dilute caustic soda solution) are dissolved in 1200 ml of water at a pH water of 6.0 – 6.5. To this solution, 13.5 g of 2,4,6-trifluoropyrimidine in 100 parts of acetone together with an aqueous solution of sodium carbonate are added drop by drop within one hour at 30°–35° in manner so that the reaction mixture remains always neutral. As soon as no free amine is any more detectable, the dye is converted into the corresponding copper complex compound by adding 100 ml of a 1-molar copper sulphate solution at 20–25°. The copper-containing dye is thereafer precipitated by adding sodium chloride, filtered off, washed with dilute sodium chloride solution and dried carefully in a vacuum. The dye of the above constitution so obtained is a dark powder which dissolved in water with blue colour.

When using equivalent amounts of the components set forth in the following Table IX, columns II to IV, and observing the reaction conditions set forth in column V, there are obtained, in accordance with the procedure described in Example 15, further dyes which on cotton yield dyeings of similarly good properties, the colour tone of which dyeings is indicated in column VI of the Table.

TABLE IX

| I | II | III | IV | V | | VI |
|---|----|-----|----|---|---|----|
| | | | | Reaction conditions | | |
| No. | Aminoformazyl dye | Metal | Pyrimidine compound | pH | temp. | Colour tone |
| 1 | N-(2-hydroxy-3-aminophenyl-5-sulphonic-acid)-N-(2'-hydroxyphenyl-3',5'-disulphonic-acid)-ms-2'',4''-disulphophenylformazan | Cu | 2,4,6-trifluoro-pyrimidine | 6.0–6.5 | 30–35° | blue |
| 2 | " | Cu | 2,4,6-trifluoro-5-chloro-pyrimidine | 6.0–6.5 | 10–15° | blue |
| 3 | N-(2-hydroxy-3-aminophenyl-5-sulphonic acid)-N'-(2'-hydroxyphenyl-3',5'-disulphonic-acid)-ms-3''-sulphophenyl-formazan | Cu | " | 6.0–6.5 | 10–15° | blue |
| 4 | " | Cu | 2,4,6-trifluoro-pyrimidine | 5.0–5.5 | 30–35° | blue |
| 5 | N-(2-hydroxy-3-aminophenyl-5-sulphonic-acid)-N'-(2'-hydroxyphenyl-3',5'-disulphonic-acid)-ms-2''-chloro-5''-sulphophenyl-formazan | Cu | " | 5.0–5.5 | 30–35° | blue |
| 6 | N-(2-hydroxy-3-aminophenyl-5-sulphonic-acid)-N'-(2'-hydroxyphenyl-3',5'-disulphonic-acid)-ms-2''-chloro-5''-sulphophenyl formazan | Cu | 2,4,6-trifluoro-5-chloro-pyrimidine | 6.0–6.5 | 10–15° | blue |
| 7 | N-(2-hydroxy-3-aminophenyl-5-sulphonic-acid)-N'-(2'-hydroxyphenyl-3',5'-disulphonic-acid)-ms-4''-sulphophenyl-formazan | Cu | " | 6.0–6.5 | 10–15° | blue |
| 8 | " | Cu | 2,4,6-trifluoro-pyrimidine | 6.0–6.5 | 40–45° | blue |
| 9 | N-(2-hydroxy-3-aminophenyl-5-sulphonic-acid)-N'-(2'hydroxyphenyl-3',5'-disulphonic-acid)-ms-phenyl-formazan | Cu | 2,4-difluoro-8-chloro-pyrimidine | 5.0–5.5 | 30–35° | blue |
| 10 | " | Cu | 2,4-difluoro-5,8-dichloro-pyrimidine | 6.5–7.0 | 30–35° | blue |
| 11 | N-(2-hydroxy-3-aminophenyl-6-sulphonic-acid)-N'-(2'-hydroxyphenyl-3',5'-disulphonic-acid)-ms-phenyl-formazan | Cu | 2,4-difluoro-5-cyano-pyrimidine | 6.5–7.0 | 30–35° | blue |
| 12 | N-(2-hydroxy-3-aminophenyl-5-sulphonic-acid)-N'-(2'-carboxyphenyl-4'-sulphonic-acid)-ms-4''-sul- | Cu | 2,4,6-trifluoro-5-chloro-pyrimidine | 6.0–6.5 | 15–20° | blue |

TABLE IX-continued

| I | II | III | IV | V | | VI |
|---|---|---|---|---|---|---|
| | | | | Reaction conditions | | |
| No. | Aminoformazyl dye | Metal | Pyrimidine compound | pH | temp. | Colour tone |
| 13 | phonic-acid-phenyl-formazan<br>N-(2-hydroxy-3-amino-phenyl-5-sulphonic-acid)-N'-(2'-carboxyphenyl-4'-sulphonic-acid)-ms-phenyl-formazan | Cu | " | 5.0–5.3 | 10–15° | blue |
| 14 | N-(2-hydroxy-3-amino-phenyl-5-sulphonic-acid)-N'-(2'-hydroxy-5'-chloro-phenyl-3'-sulphonic-acid)-ms-3''-sulphophenyl-formazan | Cu | 2,4,6-trifluoro-5-chloro-pyrimidine | 5.0–5.5 | 10–15° | blue |
| 15 | N-(2-hydroxy-3-amino-phenyl-5-sulphonic-acid)-N'-(2'-hydroxy-5'-chloro-phenyl-3'-sulphonic-acid)-ms-4''-sulphophenyl-formazan | Cu | 2,4,6-trifluoro-5-chloro-pyrimidine | 5.0–5.5 | 15–20° | blue |
| 16 | N-(2-hydroxy-3-amino-5-methyl-sulphonylphenyl)-N'-(2'-hydroxyphenyl-3',5'-disulphonic-acid)-ms-2'',4''-disulphophenyl-formazan | Cu | " | 5.0–5.5 | 15–20° | blue |
| 17 | " | Cu | 2,4,6-trifluoro-pyrimidine | 6.0–6.5 | 30–35° | blue |
| 18 | N-(2-hydroxy-3-amino-5-ethyl-sulphonylphenyl)-N'-(2'-hydroxyphenyl-3',5'-disulphonic-acid)-ms-phenyl-formazan | Cu | " | 6.0–6.5 | 30–35° | blue |
| 19 | " | Cu | 2,4,6-trifluoro-5-chloro-pyrimidine | 6.0–6.5 | 10–15° | blue |
| 20 | N-(2-hydroxy-3-amino-phenyl-5-sulphonic-acid-amide)-N'-(2'-hydroxy-phenyl-3',9'-disulphonic-acid)-ms-p-sulphophenyl-formazan | Cu | 2,4,6-trifluoro-pyrimidine | 6.0–6.5 | 30–35° | blue |
| 21 | N-(2-hydroxy-3-amino-phenyl-5-sulphonic-acid)-N'-(2'-hydroxy-5'-nitro-phenyl-3'-sulphonic-acid)-ms-4'''-sulphophenyl-formazan | Cu | 2,4,6-trifluoro-pyrimidine | 6.0–6.5 | 30–35° | blue |
| 22 | N-(2-carboxyphenyl-4-sulphonic-acid)-N'-(2'-carboxy-phenyl-4'-sulphonic-acid)-ms-4''-amino-phenyl-formazan | Cu | 2,4,6-trifluoro-5-chloro-pyrimidine | 6.0–6.5 | 15–20° | violet-blue |
| 23 | " | Ni | " | 6.0–6.5 | 15–20° | olive-green |
| 24 | N-(2-carboxylphenyl-4-sulphonic-acid)-N'-(2'-carboxyphenyl-4'-sulphonic-acid)-ms-4''-amino-benzoyl-formazan | Cu | " | 6.0–6.5 | 15–20° | brownish-red |
| 25 | " | Ni | " | 6.0–6.5 | 15–20° | yellowish-green |
| 26 | N-(2-carboxyphenyl-4-sulphonic-acid)-N'-(2'-carboxyphenyl-4'-sulphonic-acid)-ms-3''-amino-benzoyl-formazan | Cu | " | 6.0–6.5 | 15–20° | blue-green |
| 27 | " | Ni | " | 6.0–6.5 | 15–20° | brown-red |
| 28 | N-(2-hydroxy-3-amino-phenyl-5-sulphonic-acid-amide)-N'-(2'-hydroxy-phenyl-3',5'-disulphonic-acid)-ms-p-sulphophenyl-formazan | Cu | 2,4,6-trifluoro-5-bromo-pyrimidine | 6.0–6.5 | 10–15° | blue |
| 29 | N-(2-hydroxy-5-amino-phenyl-3-sulphonic-acid)-N'-(2'-carboxyphenyl-4'-sulphonic acid)-ms-2''-chloro-5''-sulphophenyl-formazan | Cu | 2,4,6-trifluoro-5-chloro-pyrimidine | 6.0–6.5 | 10–15° | blue |
| 30 | N-(2-hydroxy-3-amino-phenyl-5-sulphonic acid)-N'-(2'-carboxyphenyl-4'-sulphonic-acid)-ms-2''-chloro-5''-sulphophenyl-formazan | Cu | " | 6.0–6.5 | 10–15° | blue |
| 31 | N-(2-hydroxy-5-amino-phenyl-3-sulphonic-acid)-N'-(2'-carboxyphenyl-4'-sulphonic-acid)-ms-4''-ms-4''-methyl-3''-sulphophenyl-formazan | Cu | " | 6.0–6.5 | 10–15° | blue |
| 32 | N-(2-hydroxy-3-amino-phenyl-5-sulphonic acid)-N'-(2'-carboxyphenyl-4'-sulphonic-acid)-ms-4''-methyl-3''-sulphophenyl-formazan | Cu | 2,4,6-trifluoro-5-chloro-pyrimidine | 6.0–6.5 | 10–15° | blue |

TABLE IX-continued

| I | II | III | IV | V | | VI |
|---|---|---|---|---|---|---|
| | | | | Reaction conditions | | |
| No. | Aminoformazyl dye | Metal | Pyrimidine compound | pH | temp. | Colour tone |
| 33 | N-(2-hydroxy-3-amino-phenyl-5-sulphonic-acid)-N'-(2'-carboxyphenyl-4'-amino)-ms-3''-sulphophenyl-formazan | Cu | " | 6.0–6.5 | 30–35° | blue |

EXAMPLE 16

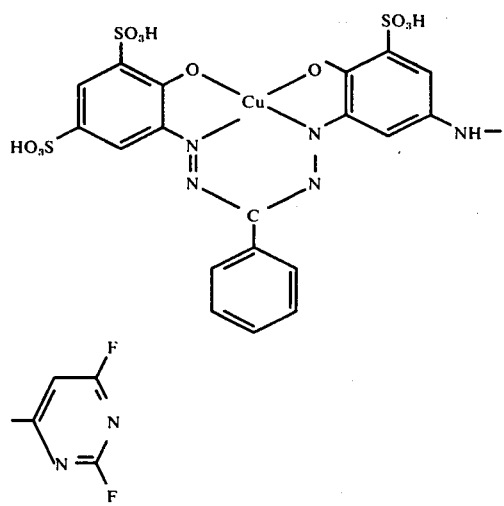

26.9 g of 2-amino-1-hydroxybenzene-4,6-disulphonic-acid are diazotized indirectly. The suspension of the diazonium compound is added dropwise, with good stirring, to a suspension of 20.4 g of phenylformylacetic-acid-ethyl ester in 200 ml of water, 250 g of dioxane and 10.5 g of a 10-n-caustic soda solution at 0°–10° in the presence of such a quantity of calc. sodium carbonate that after addition of the diazonium compound the reaction mixture exhibits weakly phenolphthalein-alkaline reaction. After completed coupling, the reaction mixture is set to a pH value of 7 by adding conc.hydrochloric acid, diluted, and heated to boiling. After addition of sufficient 10-n-caustic soda solution to ensure strongly alkaline reaction until termination of saponification, the reaction product is maintained at boiling temperature for 10 minutes on the reflux condenser. The solution of the saponification product is thereafter set to pH 7 with hydrochoric acid, admixed with a copper sulphate solution (corresponding to 7 g of copper) and thereafter combined at 0°–10° with the diazonium salt set neutral and obtained by diazotizing 38.7 g of a mixture comprising 4-[2',6'-difluoropyrimidyl-(4°)-amino]-2-amino-1-hydroxybenzene-6-sulphonic acid (prepared by condensing 2-acetylamino-4-amino-1-hydroxybenzene-6-sulphonic acid with 2,4,6-trifluoro-pyrimidine and thereafter saponifying the acetylamino group with 10% aqueous hydrochloric acid at 90°).

After heating to 40°–45°, the copper-containing formazan complex of the above formula is precipitated by adding sodium chloride, filtered off, washed with sodium chloride solution and dried carefully in a vacuum. The product is a dark powder which dissolves in water with blue colour.

EXAMPLE 17

When cotton is padded with a solution which contains 20 g of the dye, obtained in accordance with Example 13 of the Table IX, 20 g of sodium carbonate and 50 g of sodium chloride per 1000 ml of water, rolled up, stored for 4 hours, and thereafter soaped with boiling for 10 minutes, one obtains a deep, pure dyeing of dark-blue colour, which after soaping exhibits very good fastness to light and wetting.

EXAMPLE 18

When cotton is padded with a solution comprising 20 g of the dye, according to Example 12 of the Table IX, 20 g of sodium carbonate, 200 g of urea and 1000 ml of water, dried and thereafter subjected to dry heat at 140° for 5 minutes, one obtains a deep dyeing of blue colour, which after soaping exhibits high fastness to light and wetting.

EXAMPLE 19

2 g of the dye obtained in accordance with Example 19 of the Table IX are dissolved in 5000 ml of water at 40° and thereafter admixed with 0.5 g of a condensation product from 25 mols of ethylene oxide and 1 mol of octadecyl alcohol or octadecylamine, 6 g of acetic acid and finally with 0.5 g of a polyquaternary ammonium compound, e.g. the condensation product from 11.5 g of N,N',N''-pentamethyldiethyene-triamine and 14.3 g of $\beta, \beta'$-dichlorodimethylether. Into the dyeing bath so obtained, 100 g of wool are introduced, the bath is heated to boiling within 30 minutes and dyeing is performed at this temperature for one hour. Thereafter the dyeing is rinsed with 60° warm water. One obtains without an alkaline aftertreatment a uniform, blue-coloured dyeing which exhibits good fastnesses.

EXAMPLE 20

With a printing paste comprising:
 30 g of the dye according to example 16 of the Table IX,
 200 g of urea,
 400 g of water,
 340 g of a 5% aqueous solution of sodium alginate, and
 30 g of sodium bicarbonate, cotton fabric is printed, the printed fabric is steamed for 30 seconds with saturated steam at a temperature of ca. 105°, the fabric is first cold-washed and then hot-washed, rinsed for 15 minutes with a soap solution (5 g/l of soap) at boiling temperature, hot- and cold-washed again, and dried.

One obtains a purely blue printed cotton fabric which exhibits very good fastness to light and wetting.

If instead of the cotton fabric a staple rayon fabric is used, and the printed fabric is not steamed for 30 seconds, but fixing is performed during 1 minutes at 110°–150°, while otherwise the procedure is conducted in a manner analogous to that described in Example 11, one obtains a printed staple rayon fabric which exhibits the same valuable properites.

We claim:
1. A dyestuff of the formula

$$\left[\begin{array}{c}Y_1-N-\\R'\\ \text{(benzene ring)}-\underset{\substack{N\\ \|\\N\\ \|\\C-R_1}}{\overset{CO-O}{\diagdown}}Me_1\underset{N}{\overset{O}{\diagup}}A_1\end{array}\right]\begin{array}{l}(^-)_{p-1}\\(M^+)_{p-1}\\-(X_1-O^-M^+)_{n-1}\end{array}$$

wherein
$Me_1$ represents Cu, Ni, Co or Cr,
$A_1$ represents a benzene nucleus or naphthalene nucleus substituted as shown above and further substituted by hydrogen, fluorine, chlorine or bromine, nitro, cyano, lower alkyl, phenoxy, lower alkylsulphonyl, phenysulphonyl, sulphamoyl, N-mono-lower alkyl-sulphamoyl, N,N-di-lower alkyl-sulphamoyl, or lower alkanoyl,
$R_1$ represents a phenyl or naphthyl radical any substituent of which apart from any substituent $(X_1\text{-}O^-M^+)$ is selected from chlorine, bromine, lower alkyl or hydrogen,
$R'$ represents hydrogen or lower alkyl,
$X_1$ represents $-SO_2-$ or $-CO-$,
$M^+$ represents hydrogen, sodium or potassium,
$p$ represents 1 when $Me_1$ is Cr, and 2 when $Me_1$ is Cu, Co or Ni,
$n$ represents a number varying from 1 to 7, and
$Y_1$ represents a fiber reactive grouping selected from
a. a radical of the formula $$\underset{R_4}{\overset{R_3}{\diagdown}}\underset{\|}{\overset{E_1}{\diagdown}}\underset{N}{\underset{\|}{\diagdown}}N$$

wherein
$E_1$ represents $$\underset{\|}{\overset{|}{N}}\text{ or }\underset{\|}{\overset{|}{C}}-R_2,$$

and, when $E_1$ is $$\underset{\|}{\overset{|}{N}},$$

either
i. $R_3$ represents chlorine, tri-lower alkyl-ammonio, a group of the formula $$-\overset{+}{N}\underset{\diagdown\text{lower alkyl}}{\overset{\diagup\text{lower alkyl}}{-}}NH_2\text{ , the radical}$$

$$-\overset{+}{N}\diagup\diagdown\text{N or the radical }-\overset{+}{N}\diagup\diagdown\text{, and}$$

$R_4$ represents a lower alkoxy, phenoxy, amino, mono-lower alkyl-amino, di-lower alkyl-amino, phenylamino, sulphophenylamino or di-sulphophenylamino; or
ii. both $R_3$ and $R_4$ represent chlorine, bromine or fluorine, and, when $E_1$ is $$\underset{\|}{\overset{|}{C}}-R_2,$$

$R_2$ represents hydrogen, fluorine, chlorine, bromine, lower alkyl, lower alkanoyl, cyano, nitro, phenyl, N-phenyl-carbamoyl or phenylsulphonyl, and each of $R_3$ and $R_4$ represents fluorine, chlorine or bromine;

b. a radical of one of the formulas $$\underset{R_5}{\overset{-CO}{\diagdown}}\underset{N}{\overset{R_3'}{\diagup}}N\quad\text{and}\quad -CO\underset{N}{\overset{R_2'}{\diagup}}\underset{R_4'}{\overset{R_3'}{\diagdown}}N$$

wherein $R_2'$ represents hydrogen or chlorine and either
i. each of $R_3'$ and $R_4'$ represents chlorine or $-SO_3^-M^+$, or
ii. $R_3'$ represents lower alkoxy, phenoxy, amino, mono-lower alkyl-amino, di-lower alkyl-amino, phenylamino, sulphophenylamino or diulphophenylamino, and $R_4'$ represents tri-lower alkyl-ammonio, the grouping $-\overset{+}{N}\underset{\diagdown\text{lower alkyl}}{\overset{\diagup\text{lower alkyl}}{-}}NH_2$ , the radical $-\overset{+}{N}\diagup\diagdown\text{N or the radical }-\overset{+}{N}\diagup\diagdown\text{; and}$ $R_5$ represents hydrogen or lower alkyl;
c. 2,3-dichloro- or 2,3-dibromo-quinoxaline-6-carbonyl;

d. 2,3-dichloro- or 2,3-dibromo-quinoxaline-6-sulphonyl;
e. 1,4-dichloro- or 1,4-dibromo-phthalazine-6-carbonyl;
f. 2,4-dichloro- or 2,4-dibromo-quinazoline-6-carbonyl;
g. 2,4-dichloro- or 2,4-dibromo-quinazoline-7-carbonyl;
h. [4′,5′-dichloro- or 4′,5′-dibromo-6′-pyridazonyl(1′)]-lower alkanoyl;
i. p-[4′,5′-dichloro- or 4′,5′-dibromo-6′-pyridazonyl-(1′)]-benzoyl;
j. a heterocyclic radical of the formula

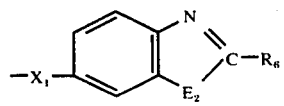

wherein $R_6$ represents chlorine, bromine or —$SO_3M^+$,
$X_1$ has the same meanings as given above; and
$E_2$ represents sulphur or oxygen;
k. a radical of the formula

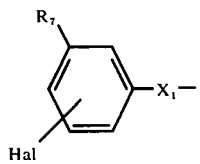

wherein $R_7$ represents nitro, lower alkylsulphonyl or sulphamoyl-phenyl, and
Hal represents fluorine or chlorine in ortho- or para-position to $R_7$, and
$X_1$ has the same meaning as above;
l. α-chloro- or α-bromo-lower alkanoyl;
m. α, β-dichloro- or α, β-dibromo-lower alkanoyl;
n. lower alkanoyl; or
o. chloro- or bromo-lower alkenoyl 2. A dyestuff as defined in claim 1, wherein
$A_1$ represents a benzene nucleus substituted as shown in the above first formula of claim 1 and further as follows: hydrogen, the grouping -$SO_3^-M^+$, lower alkylsulphonyl, phenylsulphonyl, sulphamoyl, N-mono-lower alkyl-sulphamoyl, or N,N-di-lower alkyl sulphamoyl;
$Me_1$ represents copper,
$R_1$ represents phenyl substituted by hydrogen or further by one to two groupings -$SO_3^-M^+$, chlorine, lower alkyl;
$Y_1$ represents dichloropyrimidyl-(4), trichloropyrimidyl-(4) 2,4-dichloro-pyrimidyl-5-carbonyl, 2,4-dichloro-pyrimidyl-6-carbonyl, 2,4-dichloro-s-triazinyl-(6), 2-chloro-4-amino-s-triazinyl-(6), 2-chloro-4-sulphophenylamino-s-triazinyl-(6), or 2-chloro-4-lower alkoxy-s-triazinly-(6);
R′ represents hydrogen, the number of $X_1$-$O^-M^+$ groupings ranging from 2 to 4.

3. A dyestuff as defined in claim 2 wherein

represents the grouping

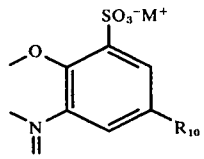

wherein
$R_{10}$ represents -$SO_3^-M^+$ or lower alkylsulphonyl.

4. A dyestuff a defined in claim 3, wherein the group $Y_1$-NR′- is in 5-position,
$Y_1$ represents 2,4-dichloro-pyrimidyl-5-carbonyl,
$R_{10}$ represents -$SO_3^-M^+$, and
$R_1$ represents the group

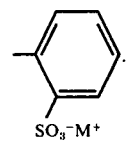

5. A dyestuff as defined in claim 3, wherein the group $Y_1$-NR′- is in 5-position,
$Y_1$ represents 2,4-dichloro-pyrimidyl-5-carbonyl
$R_{10}$ represents -$SO_3^-M^+$, and
$R_2$ represents the group

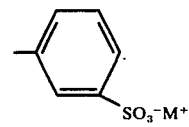

6. A dyestuff as defined in claim 3, wherein the group $Y_1$—NR′—is in 5-position,
$Y_1$ represents 2,4,5-trichloropyrimidyl-(6),
$R_{10}$ represents -$SO_3^-M^+$, and
$R_1$ represents the group

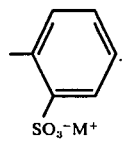

7. A dyestuff as defined in claim 3, wherein the group $Y_1$—NR′—is in 5-position,
$Y_1$ represents 2,4,5-trichloropyrimidyl-(6),
$R_{10}$ represents —$SO_3^-M^+$, and
$R_1$ represents the group

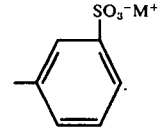

8. A dyestuff as defined in claim 3, wherein the group $Y_1$—NR′— is in 4-position,
$Y_1$ represents 2,4-dichloro-s-triazinyl-(6),
$R_{10}$ represents —$SO_3^-M^+$, and
$R_1$ represents the group

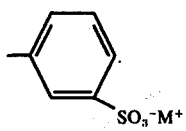

9. A dyestuff as defined in claim 3, wherein the group $Y_1$—NR' is in 5-position,
$Y_1$ represents 2,4-dichloro-pyrimidyl-6-carbonyl,
$R_{10}$ represents methylsulphonyl, and
$R_1$ represents the group

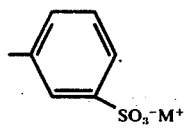

10. A dyestuff as defined in claim 2, wherein $Y_1$ represents the grouping

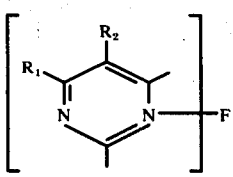

wherein $R_1$ is selected from hydrogen, fluorine, chlorine bromine, lower alkyl, lower alkyl substituted by chlorine, phenyl, carbamoyl, lower alkoxy carbonyl, cyano, sulphamoyl lower alkylsulphonyl, or nitro;
$R_2$ is selected from hydrogen, fluorine, chlorine, or bromine, lower alkyl, lower alkyl substituted by chlorine, phenyl, carbonyl lower alkyl ester group, or cyano.

11. A dyestuff as claimed in claim 10, wherein $Y_1$ represents the grouping

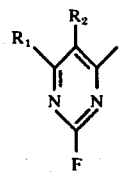

wherein $R_1$ represents chlorine or fluorine and
$R_2$ represents hydrogen, chlorine, bromine, or nitro.

12. A dyestuff as defined in claim 10 which is of the formula

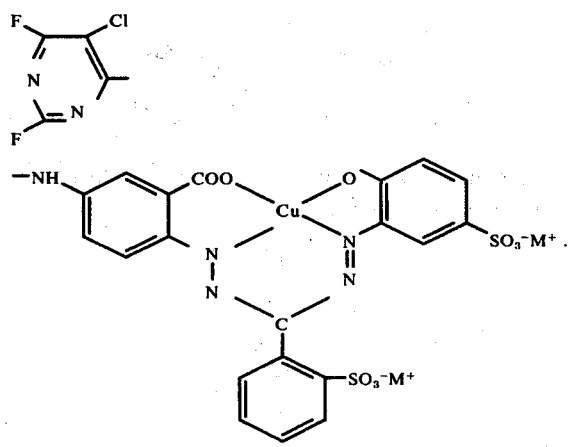

13. A dyestuff as defined in claim 10 which is of the formula

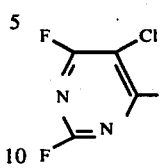
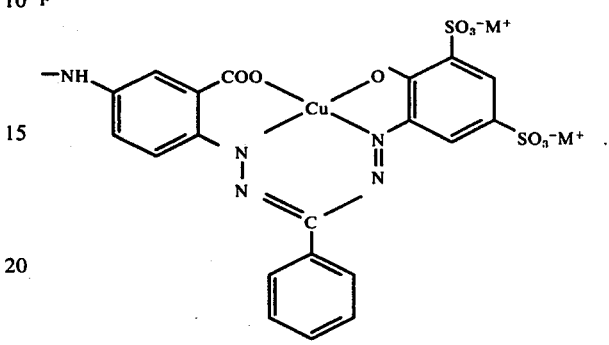

14. A dyestuff as defined in claim 10 which is of the formula

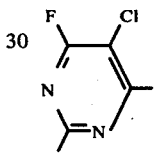
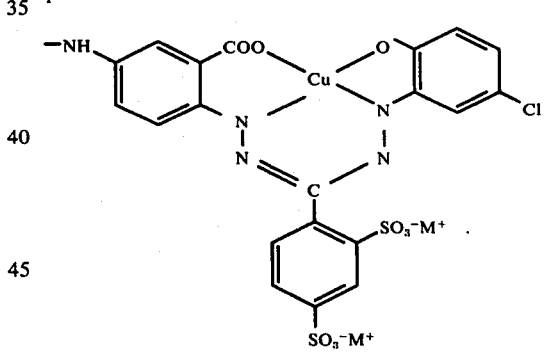

15. A fiber-reactive, heavy metal-containing formazane dye of the formula

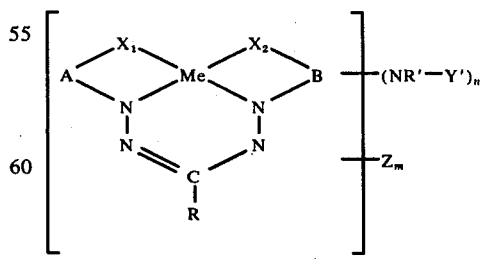

in which
R denotes a phenyl or benzoyl radical any substituent of which apart from any substituent Z or NR'—Y' is selected from fluorine, chlorine, bromine, lower alkyl or nitro;

A and B each denote a phenyl radical, which radicals contain $X_1$ and X respectively in the o-position to the nitrogen bond, any substituent of which apart from any substituent Z and NR'—Y' is selected from lower alkyl, chlorine, bromine, nitro and lower alkylsulphonyl, $X_1$ and $X_2$ each denote a metal-binding substituent, Z denotes a salt-forming, water-solubilizing group exhibiting acid dissociation in water of the formula $(X_1O^-M^+)$ wherein $X_1$ represents —$SO_2$— or —CO— and $M^+$ represents hydrogen, sodium or potassium, Y' denotes a pyrimidyl group of the formula

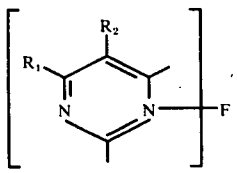

wherein $R_1$ is selected from hydrogen, fluorine, chlorine, bromine, lower alkyl, lower alkyl substituted by chlorine, phenyl, carbamoyl, lower alkoxy carbonyl, or cyano, and $R_2$ is selected from hydrogen, fluorine, chlorine, bromine, lower alkyl, lower alkyl substituted by chlorine, phenyl, lower alkoxy carbonyl, carbamoyl, cyano, sulphamoyl, lower alkyl sulphonyl or nitro, R' denotes hydrogen or a lower alkyl group, Me denotes a heavy metal of atomic numbers 24 to 29, m denotes a positive integer from 1 to 5, n denotes a positive integer not exceeding 2, and Y'—NR' must be linked to a carbon atom of:
a. B when $X_1$ is —COO— and $X_2$ is —O—;
b. A or B when both $X_1$ and $X_2$ are —O—, and
c. A, B or R when both $X_1$ and $X_2$ are —COO—.

16. A fiber-reactive, heavy metal-containing formazane dye as defined in claim 15 which is of the formula

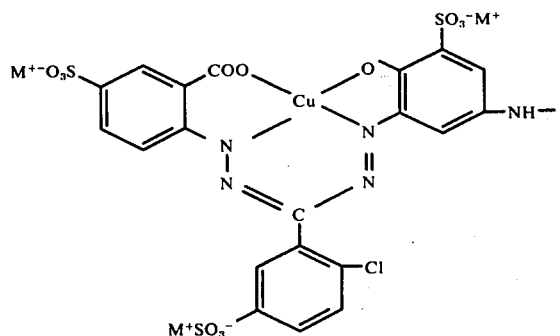

17. A dyestuff as defined in claim 10 which is of the formula

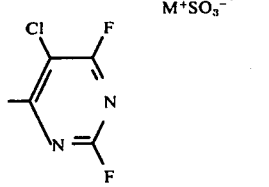

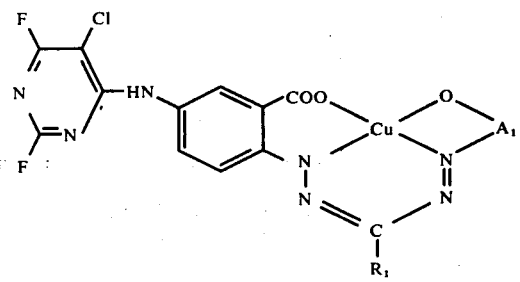

wherein

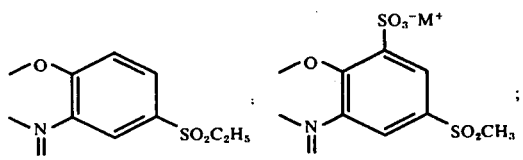 represents a grouping selected from

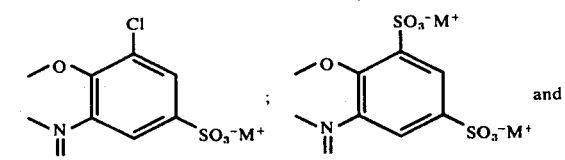

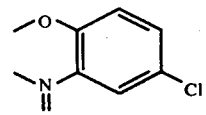

and 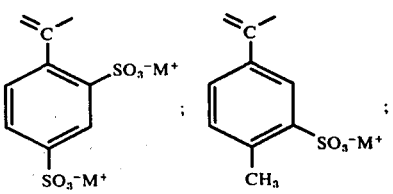 represents a grouping selected from

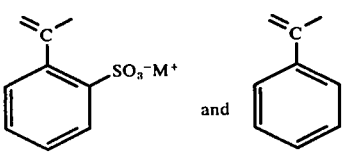

18. A dyestuff as defined in claim 15, wherein Y' represents the grouping

wherein
R$_1$ represents fluorine or chlorine, and
R$_2$ represents hydrogen, chlorine, bromine, or cyano,
Me represents copper or nickel, from X$_1$ and X$_2$ one X represents —COO— and the other X —O—,
m represents 2, 3 or 4,
n represents 1, and
R' represents hydrogen, and wherein the grouping (NR'—Y—)$_n$ is linked to B.

19. A dyestuff as defined in claim 18 which is of the formula

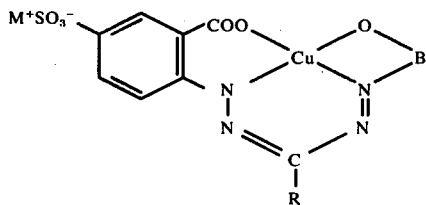

wherein
B is selected from

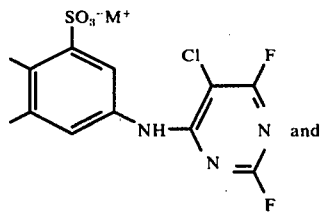

-continued

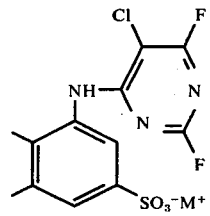

and R is selected from

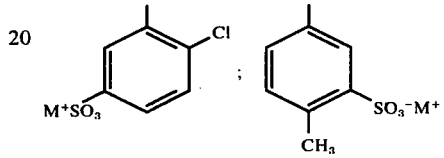

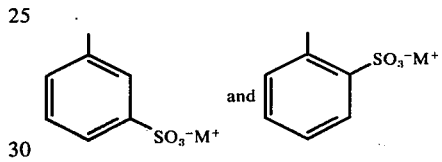

* * * * *